US012647838B2

(12) United States Patent
Simoniy et al.

(10) Patent No.: US 12,647,838 B2
(45) Date of Patent: Jun. 2, 2026

(54) METHODS AND DEVICES FOR PERFORMING HANDOVER USING ANOTHER COMMUNICATION PROTOCOL

(71) Applicant: Intel Corporation, Santa Clara, CA (US)

(72) Inventors: Eran Simoniy, Regavim (IL); Amihud Rothmann, Haifa (IL); Oren Haggai, Kefar Sava (IL)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 17/693,496

(22) Filed: Mar. 14, 2022

(65) Prior Publication Data

US 2023/0292186 A1     Sep. 14, 2023

(51) Int. Cl.

| | |
|---|---|
| *H04W 36/00* | (2009.01) |
| *H04W 88/04* | (2009.01) |
| *H04W 4/80* | (2018.01) |
| *H04W 36/30* | (2009.01) |
| *H04W 36/32* | (2009.01) |
| *H04W 84/12* | (2009.01) |
| *H04W 88/06* | (2009.01) |

(52) U.S. Cl.
CPC ... *H04W 36/0016* (2013.01); *H04W 36/0083* (2013.01); *H04W 88/04* (2013.01); *H04W 4/80* (2018.02); *H04W 36/30* (2013.01); *H04W 36/326* (2023.05); *H04W 84/12* (2013.01); *H04W 88/06* (2013.01)

(58) Field of Classification Search
CPC ......... H04W 36/0016; H04W 36/0083; H04W 88/04; H04W 4/80; H04W 36/30; H04W 36/326; H04W 84/12; H04W 88/06; H04W 36/033; H04W 36/322; H04W 36/302; H04W 36/04; H04W 36/08; H04W 72/23; H04W 40/36; H04W 40/244; H04L 12/1845; H04L 9/32
See application file for complete search history.

(56) References Cited

U.S. PATENT DOCUMENTS

| | | | | |
|---|---|---|---|---|
| 9,491,237 B1* | 11/2016 | Garg | .................. | H04L 12/1845 |
| 2010/0093354 A1* | 4/2010 | Agashe | ................. | H04W 36/04 |
| | | | | 455/436 |

(Continued)

FOREIGN PATENT DOCUMENTS

| | | | | |
|---|---|---|---|---|
| EP | 1133119 A2 * | 9/2001 | ............. | H04B 17/27 |

*Primary Examiner* — Vinncelas Louis
(74) *Attorney, Agent, or Firm* — Viering, Jentschura & Partner mbB

(57) ABSTRACT

A communication device may include a processor configured to determine to hand over an established connection with a first communication device based on information indicating a proximity of the first communication device to the communication device, wherein the established connection is configured to exchange data between the communication device and the first communication device according to a first communication protocol. The processor may further encode a message indicating the handover of the established connection for a transmission to a second communication device and may encode data to be transmitted to the first communication device for a transmission to the second communication device according to a second communication protocol.

20 Claims, 11 Drawing Sheets

(56) References Cited

U.S. PATENT DOCUMENTS

| | | | | |
|---|---|---|---|---|
| 2012/0182995 A1* | 7/2012 | Li | .......................... | H04W 40/36 |
| | | | | 370/392 |
| 2014/0135019 A1* | 5/2014 | Jang | ................... | H04W 36/302 |
| | | | | 455/437 |
| 2015/0195865 A1* | 7/2015 | Lee | ....................... | H04W 72/23 |
| | | | | 455/426.1 |
| 2016/0261332 A1* | 9/2016 | Bodas | ................. | H04W 40/244 |
| 2018/0270658 A1* | 9/2018 | Zeng | ......................... | H04L 9/32 |
| 2024/0031893 A1* | 1/2024 | Wu | ....................... | H04W 36/08 |
| 2024/0397399 A1* | 11/2024 | Gupta | ................. | H04W 36/322 |

* cited by examiner

102

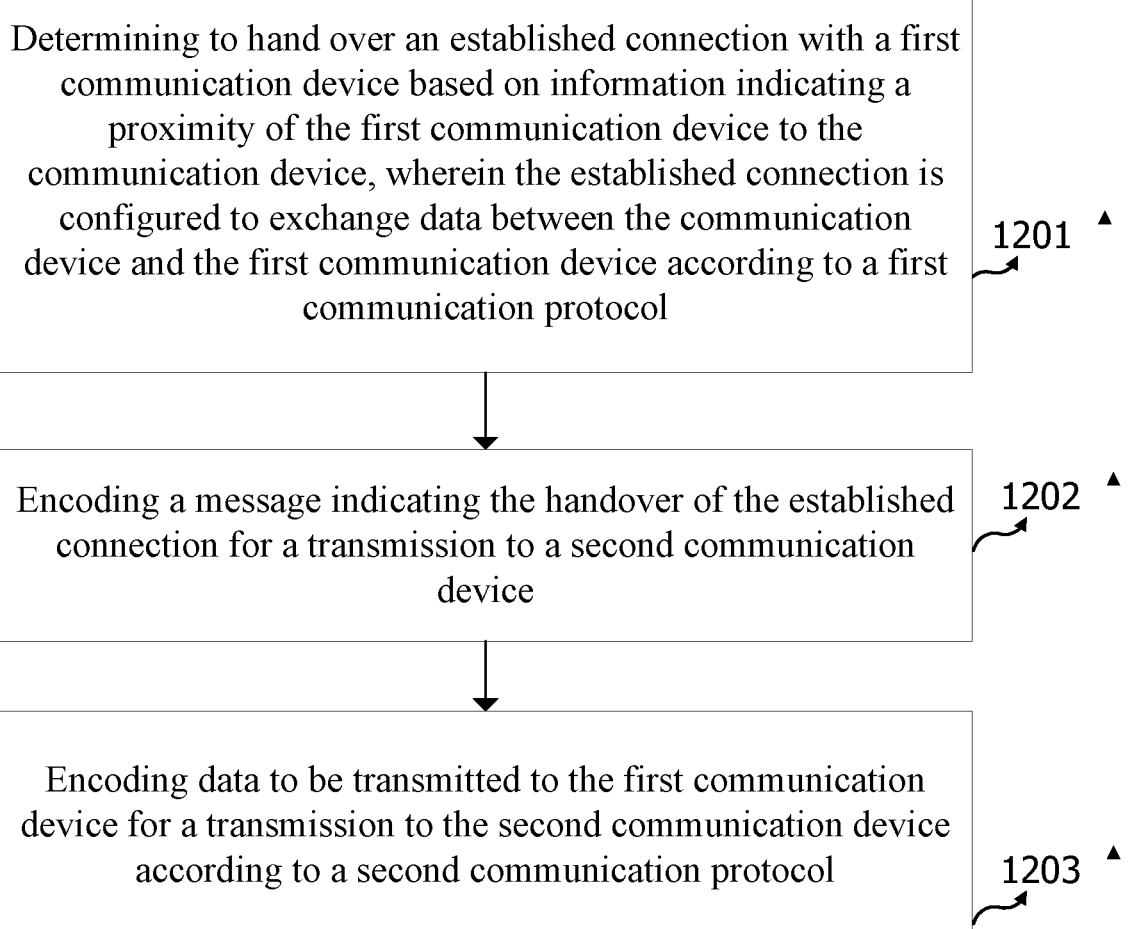

Determining to hand over an established connection with a first communication device based on information indicating a proximity of the first communication device to the communication device, wherein the established connection is configured to exchange data between the communication device and the first communication device according to a first communication protocol       1201

Encoding a message indicating the handover of the established connection for a transmission to a second communication device       1202

Encoding data to be transmitted to the first communication device for a transmission to the second communication device according to a second communication protocol       1203

FIG. 12

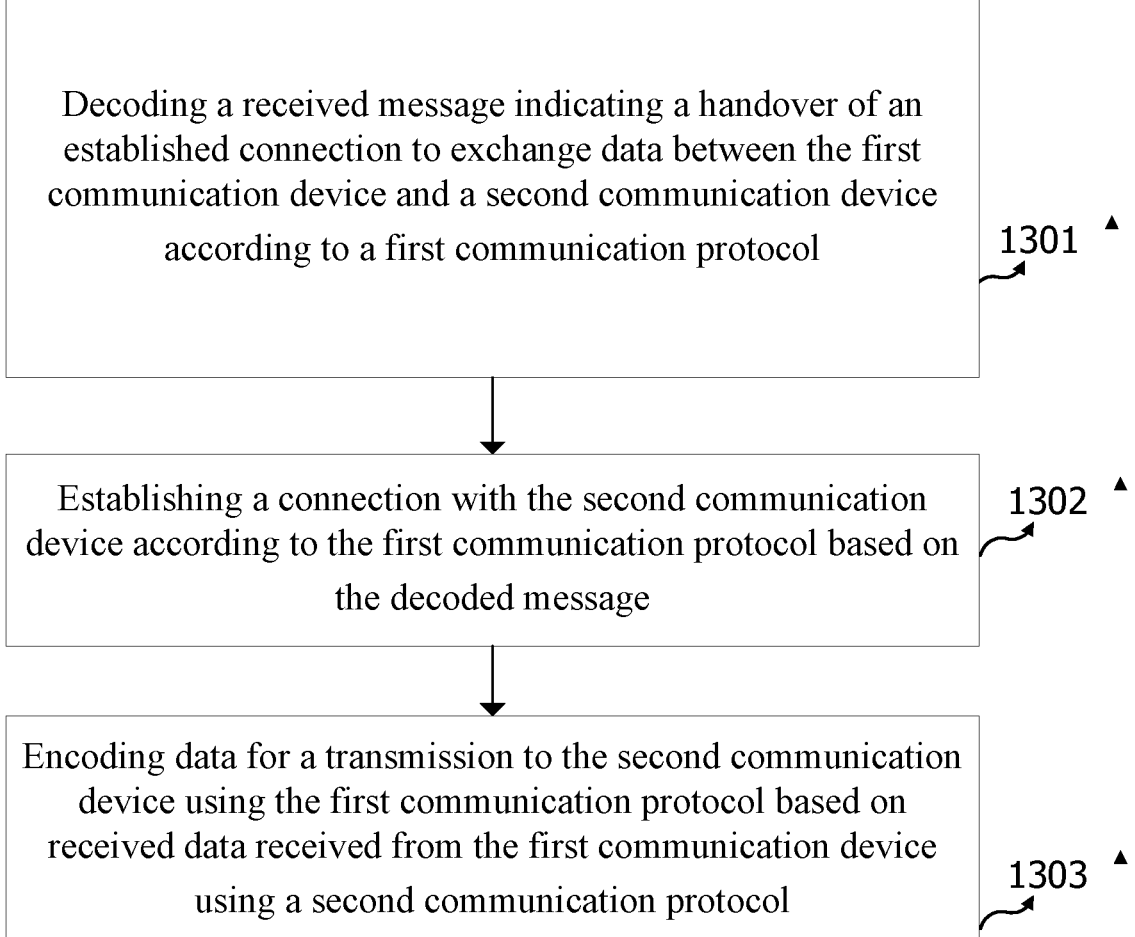

Decoding a received message indicating a handover of an established connection to exchange data between the first communication device and a second communication device according to a first communication protocol    1301

Establishing a connection with the second communication device according to the first communication protocol based on the decoded message    1302

Encoding data for a transmission to the second communication device using the first communication protocol based on received data received from the first communication device using a second communication protocol    1303

FIG. 13

METHODS AND DEVICES FOR PERFORMING HANDOVER USING ANOTHER COMMUNICATION PROTOCOL

TECHNICAL FIELD

This disclosure generally relates to methods and devices to determine to hand over radio communication.

BACKGROUND

In radio communication technologies involving mobile devices, a handover procedure for transferring a session to exchange information over an established connection according to a designated communication protocol between two communication devices to another connection that is to be established between one of the two communication devices with a third communication device. A handover procedure may include a transfer of the communication link of a server to another server in server-client based networks, or a transfer of the communication link of a peer device to another peer device in peer-to-peer networks.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 12 shows an example of a method;

FIG. 13 shows an example of a method;

DESCRIPTION

Figure 1:
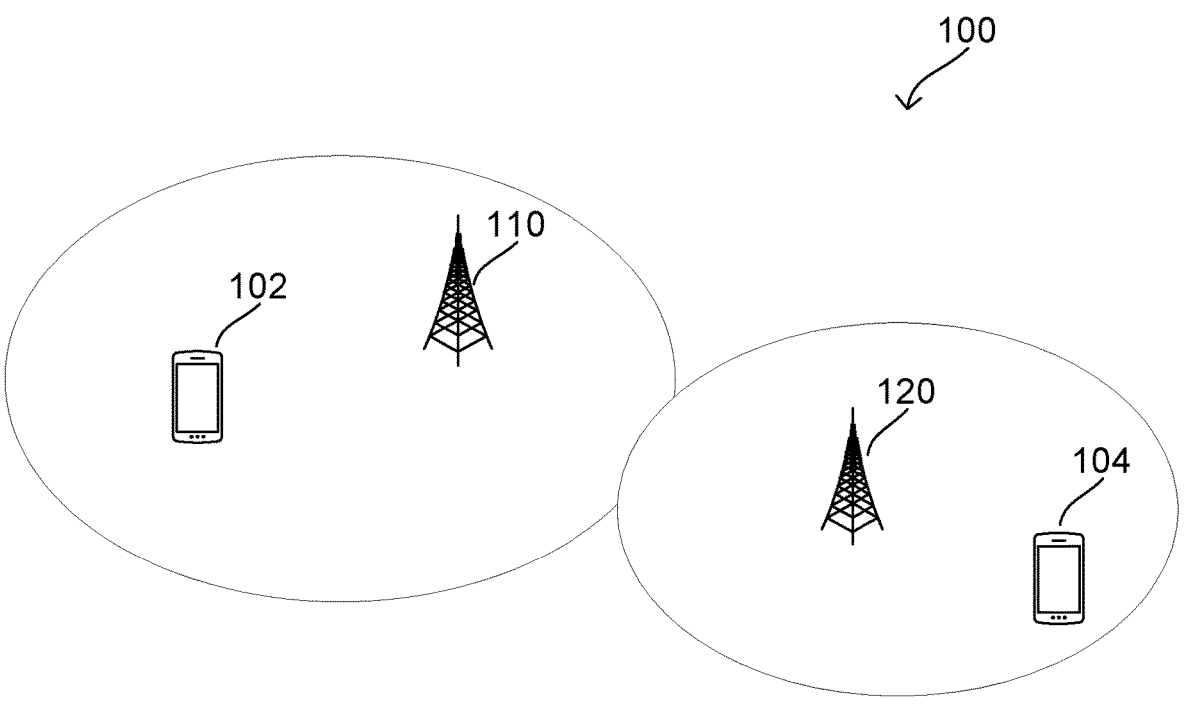
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

As used herein, "communication device" may refer to any type of electronic devices that are able to exchange information with at least another device, for example according to various types of radio communication technologies and using various types of communication protocols as exemplarily provided herein. Exemplarily, a communication device may be, or may include, an access point, a station, any types of user devices which may include a suitable device including a processor, that may include, a mobile device or a non-mobile device, a user equipment (UE), a computing device, such as a personal computer (PC), a desktop computer, a mobile computer, a laptop computer, a notebook computer, a tablet computer, a server, a handheld computing device, a wearable device, such as a smart bracelet, a smart watch, smart glasses, a smart ring, etc., an internet of things (IoT) device, a sensor, a mobile phone, a cellular telephone, any types of wireless accessories, such as a headphone, a headset, a microphone, a speaker, a domotics (smart home) device, etc.

As used herein, the term "handover" may refer to a transfer, or a process of transferring (handing over), of a session to exchange data with one communication entity (e.g. a communication device or a network) to another communication entity. A connection handover may refer to a transfer, or a process of transferring, of a link of a connection to another communication entity, so that another communication entity is connected to the other link of the connection.

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies including Wireless Personal Area Network (WPAN) standards (e.g., according to any IEEE 802.15 standard), Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Bluetooth (BT) technology may use frequencies between 2.402 and 2.480 GHz, or 2.400 and 2.4835 GHz including guard bands 2 MHz wide at the bottom end and 3.5 MHz wide at the top, according to frequency-hopping spread spectrum. A communication device operating according to a Bluetooth protocol may divide data to be transmitted into packets, and transmit each packet into a channel designated for the use (e.g. of a bandwidth of 1 MHz for classic Bluetooth and 2 MHz for Bluetooth Low Energy). A communication device configured to operate according to a Bluetooth protocol may operate in a basic rate (BR) mode using a Gaussian frequency-shift keying (GFSK) modulation, and/or operate in an enhanced data rate (EDR) mode, that is considered to provide a faster data rate and lower power consumption, using a differential phase-shift keying (DPSK) (e.g. 8-DPSK) and/or differential quadrature phase-shift keying (DQPSK) (e.g. it/4-DQPSK) based on the quality of the communication channel. A communication device configured to operate according to a Bluetooth protocol may operate according to the Bluetooth Low Energy (BLE) technology that is integrated within the Bluetooth standard starting from v4.0, which operates within the same frequency spectrum, using GFSK modulation.

Unless explicitly specified, the term "transmit" encompasses both direct (point-to-point) and indirect transmission (via one or more intermediary points). Similarly, the term "receive" encompasses both direct and indirect reception.

Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

In accordance with various aspects of this disclosure, a handover procedure may be facilitated through which the communication between two communication devices is maintained by employing another communication device that can communicate with the two communication devices. For example, a computer may initiate the handover procedure to maintain the communication with a BT peripheral device based on the proximity to the BT peripheral device. The computer may use RSSI measurements to determine the proximity. A relay communication device may establish a BT connection with the BT peripheral device to exchange BT data with respect to the communication between the computer and the BT peripheral device. The relay communication device may communicate with the BT peripheral device according to a BT protocol and may communicate with the computer using another communication protocol (such as an IEEE 802.11 protocol or a cellular telecommunication protocol) to relay data in-between.

Figure 2:
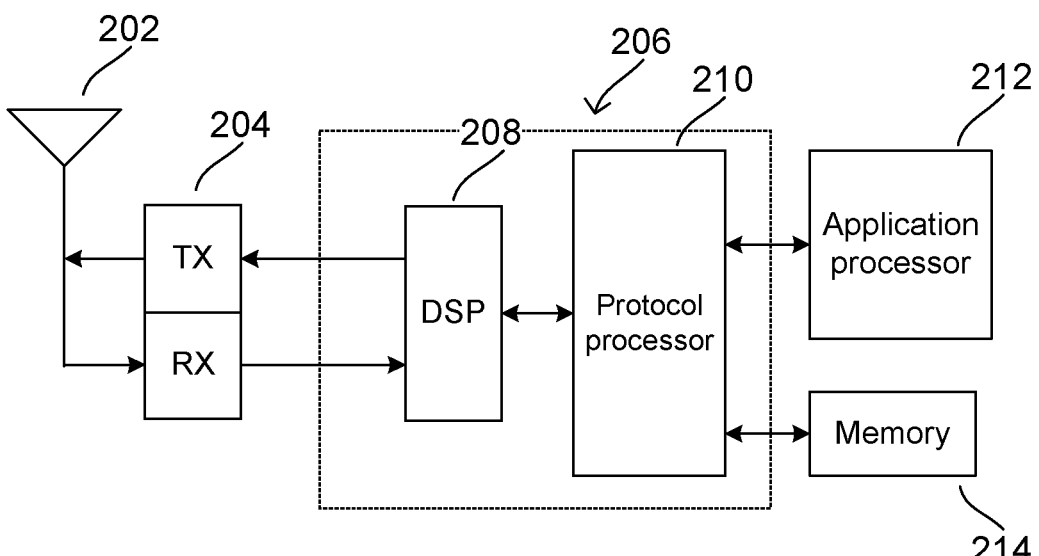
FIG. 2 shows an exemplary internal configuration of a communication device.

FIGS. 1 and 2 depict a general network and device architecture for wireless communications. In particular, FIG. 1 shows exemplary radio communication network 100 according to some aspects, which may include communication devices depicted as terminal devices 102 and 104 and communication devices depicted as network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount. In various examples, terminal devices 102 and 104 may communicate with each other without involvement of the radio access network, such as over a peer to peer network.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device. The communication device may include a terminal device 102 according to some aspects, and it will be referred to as terminal device 102, but the communication device may also include various aspects of network access nodes 110, 120 as well. The terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling, and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112.

Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
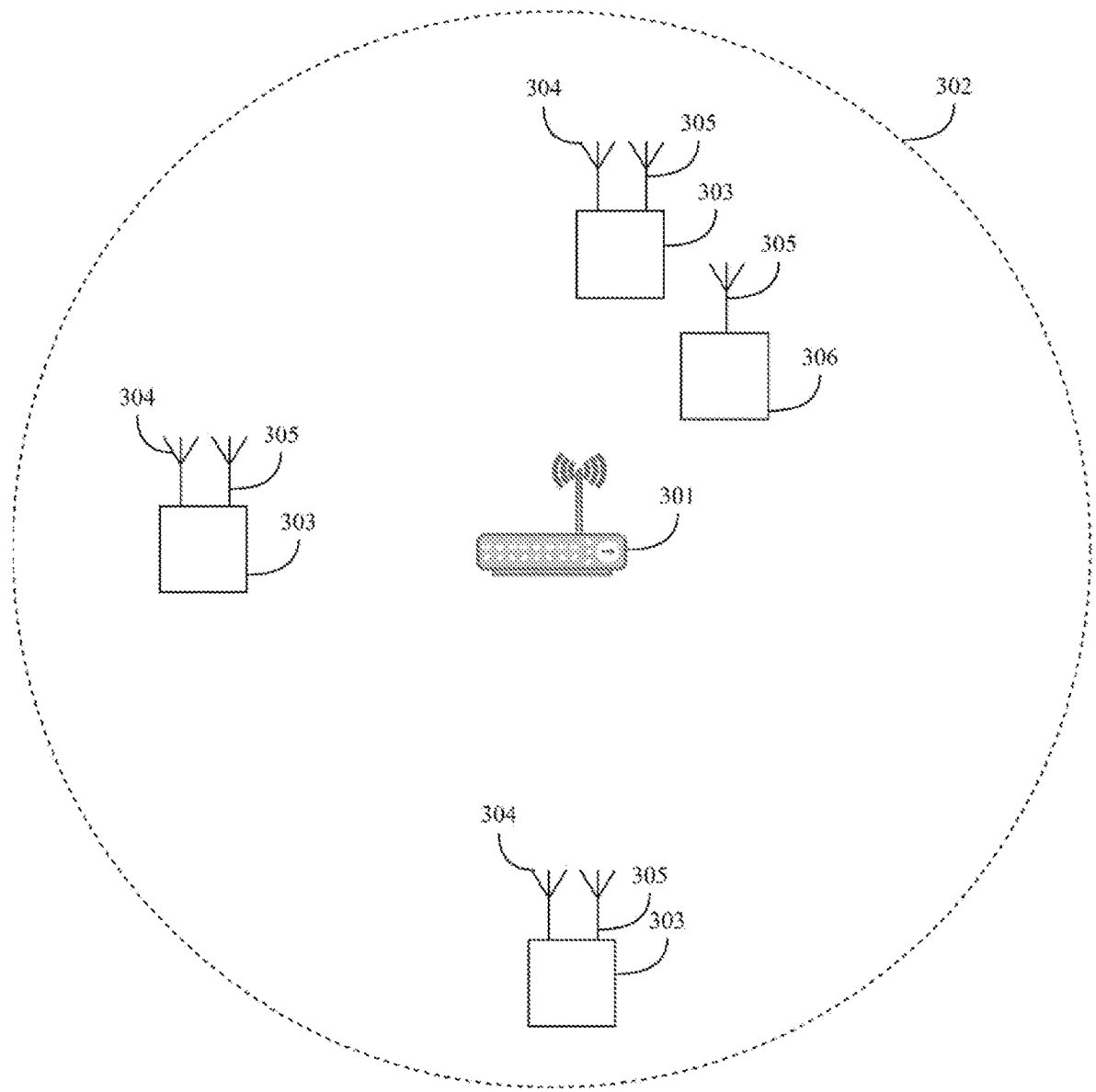
FIG. 3 shows an exemplary illustration of a network environment including various types of communication devices.

FIG. 3 shows an exemplary illustration of a network environment including various types of communication devices in accordance with various aspects of this disclosure. The network environment is depicted to include various types of wireless communication devices configured to communicate with radio communication signals in the network. The network 300 may include one or more access points 301 that provides access to the network according to a communication technology, which may include a short-range radio communication technology governed by a first communication protocol, such as WLAN, governed by a WLAN communication protocol, configured provide services within a coverage area 302. There may be various types of communication devices 303 within the network including various circuits and components configured to receive and transmit radio communication signals according to the first communication protocol using an antenna 305 reserved for the respective radio communication signals according to the first communication protocol. Accordingly, the communication devices 303 may access the network 300 that over the one or more access points 301.

In various examples, the communication devices 303 may also be configured to communicate with another communication device that is within a certain proximity to a respective communication device 303 using a second communication protocol. For example, the communication devices 303 may include various circuits and components configured to receive and transmit radio communication signals of a short-range wireless technology (e.g. Bluetooth) having a coverage area that is smaller than the coverage area 302 that the network provides according to the second communication protocol (e.g. Bluetooth protocol) using an antenna 305. Exemplarily and based on the use case, Bluetooth technology may allow a communication device to operate with a lower power consumption relative to various radio communication technologies, allowing data exchange between connected communication devices, especially for connected communication devices relying on battery power for a longer period of time.

It is depicted in this illustrative example that each antenna 304, 305 is a single antenna but this may not be limiting. The antennas 304, 305 may be designated to have only one antenna for both communication technologies. Each antenna 304, 305 or at least one of the antennas 304, 305 may include a plurality of antennas configured to operate in a complementary manner to support multiple antenna technologies, such as maximum ratio combining, beamforming, etc. Communication devices 303, 306 may include further antennas that are designated to be used for further radio communication technologies that a respective communication device may be configured to operate.

Furthermore, there may be one or more further communication devices 306 that may be located in the coverage area 302 that may be configured to operate at least according to the second communication protocol. The one or more further communication devices 306 include at least one antenna 305 that is coupled, which the one or more further communication devices 306 may be configured to transmit and/or receive radio communication signals according to the second communication protocol. The one or more further communication devices 306 may further include various components and circuits that may operate according to further communication protocols, including the first communication protocol.

As indicated, the second communication protocol may have a coverage area that is smaller than the coverage area 302, and the further communication device 306 may be configured to communicate with at least one of the communication devices 303 according to the second communication protocol, by being located within a certain proximity to the respective communication device 303. In such constellation, at least one of the respective communication device 303 or the further communication device 306 may be a communication device that may be mobile, hence the proximity between each node of the referred communication according to the second communication protocol may vary, which may result in a variation at the data rate, or a disconnection.

For example, although Bluetooth technology (e.g. BR/EDR) may support a nominal maximum range of 100 meters, practically, and based on various limitations that a communication device may encounter in terms of use case, a number of antennas, maximum transmission power, battery constraints, interferences, reflection, etc., the range of a Bluetooth connection may be less than 10 meters, 5 meters, or even less. Considering an exemplary connection between a computing device (e.g. a computer such as a PC) and a headset configured to exchange audio data with the computing device over an established Bluetooth connection, the computing device may be a stationary device, but the user may enjoy the freedom to use the headset in a mobile manner. In work or home environment, the user may desire the flexibility to walk around the office or within the house while carrying and using the headset exchanging audio data with the computing device in a substantially seamless manner. The quality and the range of the established connection may be enhanced by increasing the transmission power or providing more antenna diversity, however, these approaches may result in higher power consumption and reduce the battery life, or may lead to higher platform cost or limitations, especially with respect to positions of antennas within a mobile device. Hence, it may be desirable to provide the ability of further mobility within an environment for at least one of the nodes of the established connection to exchange data between at least two communication devices.

In accordance with various aspects of this disclosure, a handover may be introduced, in which a communication device that has established a connection to exchange data with a further communication device over a first communication protocol may hand over the communication with the further communication device to another communication device that is able to operate according to the first communication protocol. The communication device may send the data to be exchanged with the further communication device to the another communication device over a connection according to a second communication protocol, and the another communication device may relay the data received from the communication device to the further communication device according to the first communication protocol. In various aspects, communication protocols may be a communication protocol according to different radio communication technologies.

Figure 4:
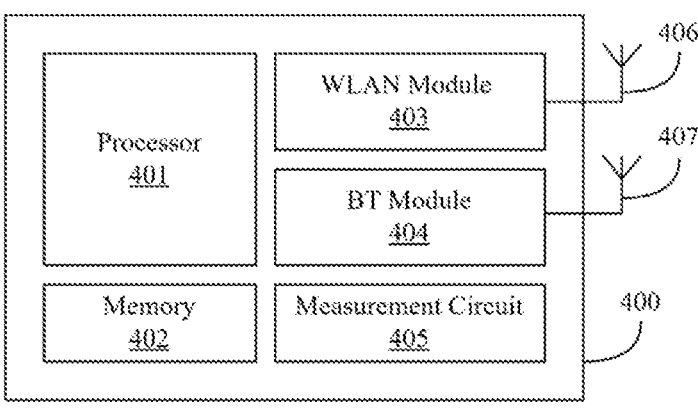
FIG. 4 shows an example illustration of an internal configuration of a communication device.

FIG. 4 shows an example illustration of an internal configuration of a communication device. The communication device 400 may include a processor 401, a memory 402, a first communication module that is depicted as a WLAN module 403, a second communication module that is depicted as a BT module 404, and a measurement circuit 405. The communication device 400 may further include, or respective modules may be couplable to, a first antenna 406 and a second antenna 407. Although the first antenna 406 and the second antenna 407 are depicted as single antennas, the first antenna 406 and/or the second antenna 407 may include a plurality of antennas.

The WLAN module 403 and the BT module 404 may realize various functions as provided with respect to FIG. 2 that are arranged for the respective communication technology and the respective communication protocol. Accordingly, the WLAN module 403 may include a transceiver circuit (e.g. RF transceiver 204) configured to transmit and receive WLAN radio communication signals. The WLAN module 403 may further include a processor (e.g. protocol processor 210) configured to process received radio communication signals according to a WLAN communication protocol. Similarly, the BT module 404 may include a transceiver circuit (e.g. RF transceiver 204) configured to transmit and receive Bluetooth (BT) radio communication signals. The BT module 404 may further include a processor (e.g. protocol processor 210) configured to process received radio communication signals according to a BT communication protocol.

The processor 401 may include one or more processors or processing units that are configured to perform various functions to provide suitable processing for the communication device 400. The processor 401 may include an application processor (e.g. application processor 212). For example, the processor 401 may include a central processing unit, a graphics processing unit, a hardware acceleration unit, a neuromorphic chip, and/or a controller. The processor 401 may be implemented in one processing unit, e.g. a system on chip (SOC), or a processor. In accordance with various examples, the processor 401 may further provide further functions to process received radio communication signals according to respective communication protocols. The memory 402 may store various types of information required for the processor 401, or modules 403, 404 to operate in accordance with various aspects of this disclosure.

In accordance with various aspects of this disclosure, the communication device 400 may provide various functions with respect to an established connection with another communication device based on information that may indicate proximity with the another communication device. The communication device 400 may store information indicating proximity with the another communication device. In various examples, the communication device 400 may measure the distance between the communication device 400 and the another communication device continuously, periodically, and/or aperiodically based on a detectable event using a sensor. Exemplarily, a detectable event may include detection of a decreased data rate, a data rate below a predefined data rate value, a detected receive power of radio communication signal, power of received radio communication signals being below a predefined power value, etc.

In various examples, the communication device 400 may obtain the information indicating proximity with another communication device based on a proximity estimation. The measurement circuit 405 may be configured to measure received radio communication signals, and the processor 401 may obtain the information indicating proximity with another communication device based on an estimation according to the measurement. In various examples, the processor 401 may use the measurement as proximity information with respect to the another communication device.

For this purpose, the measurement circuit 405 may measure the signal strength of a received radio communication signal that is received from the another communication device over the established connection according to the respective communication protocol. For this example, the communication device 400 may establish the connection to exchange data with the another communication device using BT communication protocol. Accordingly, the measurement circuit 405 may measure the strength of radio communication signals received by the second antenna 407 coupled to the BT module 404. The measurement circuit 405 may measure the strength of predefined radio communication signals, such as beacon signals transmitted by the another communication device.

The measurement circuit 405 may measure the power of the received radio communication signal and provide an output indicating the measured power to the processor 401. The processor 401 may estimate the proximity based on the output of the measurement circuit 405. In various examples, the processor 401 may use the measured power as a metric to indicate the proximity of the another communication device, and perform further operations with respect to the proximity of the another communication device to the communication device 400 based on the measured power that may be represented in milliwatts (mW) or decibel-milliwatts (dBm). In various examples, the processor 401 may use a quality parameter indicating the quality of the connection (e.g. link quality (LQ) in BT) as the information indicating the proximity.

In various examples, the processor 401 may use the measured power to obtain an indication with respect to a power value relative to a predefined parameter stored in the memory 402. The processor 401 may use the measured power to calculate a received signal strength indication (RSSI) according to the predefined parameters stored in the memory 402. In various examples, the parameter may be defined by the manufacturer of the respective radio communication module, which is the BT module 404 in this example. Although the processor 401 is exemplarily provided herein to obtain information with respect to measured power, a processor of the BT module 404 may also obtain the information in a similar manner. Accordingly, the processor 401 may perform further operations with respect to the proximity of the another communication device based on the RSSI.

In accordance with various aspects of this disclosure, the skilled person would appreciate that the communication device 400 may receive the information indicating the proximity between the communication device 400 and the another communication device from the another communication device. In such an example, the another communication device may obtain the information indicating the proximity as exemplarily provided for the communication device 400, and transmit data including the information indicating the proximity to the communication device 400. The communication device 400 may use the received information received from the another communication device.

The processor 401 may determine that an established connection with the another communication device may be adversely affected based on the information indicating the proximity of the another communication device to the communication device 400. As indicated, the information indicating the proximity may include proximity information obtained with a sensor, or information that is based on the measured power (e.g. absolute power, or the RSSI). In various examples, the information indicating the proximity may be the measured power or the RSSI. The information indicating the proximity may include a value of various levels that is based on the measured power or the RSSI. For example, the processor 401 may set the information indicating the proximity based on the value of the measurement and a predefined value. The processor 401 may set the information indicating the proximity as "acceptable for connection" in case the measurement is above a predefined value, and the processor may set the information indicating the proximity as "not acceptable" in case the measurement is below a predefined value in a binary manner.

The processor 401 may obtain measurements with respect to the signal strength (e.g. measured power or RSSI) at different instances of time, and the processor 401 may determine and/or set the information indicating the proximity based on the measurements of plurality instances of time. In various examples, the processor 401 may calculate a change value representing a difference of two measurements, and the processor 401 may determine to hand over the established connection based on the change value.

In accordance with various aspects of this disclosure, the processor 401 may establish a session to exchange data over the established connection with the another communication device. For example, a BT device that is configured to exchange audio data may establish an audio session to exchange audio data. An upper layer of the network stack (e.g. application layer) may provide the audio data to be sent, or may receive the audio data that was received according to the established session from lower layers of the network stack. In various examples, the session may be associated with an identifier to identify the respective session, and/or a session pass-phrase (e.g. a session key) to encrypt or decrypt the data with respect to the session. In various examples, the session identifier and the session key may be shared between the communication entities (e.g. nodes) that are configured to exchange data with respect to the session.

Figure 5:
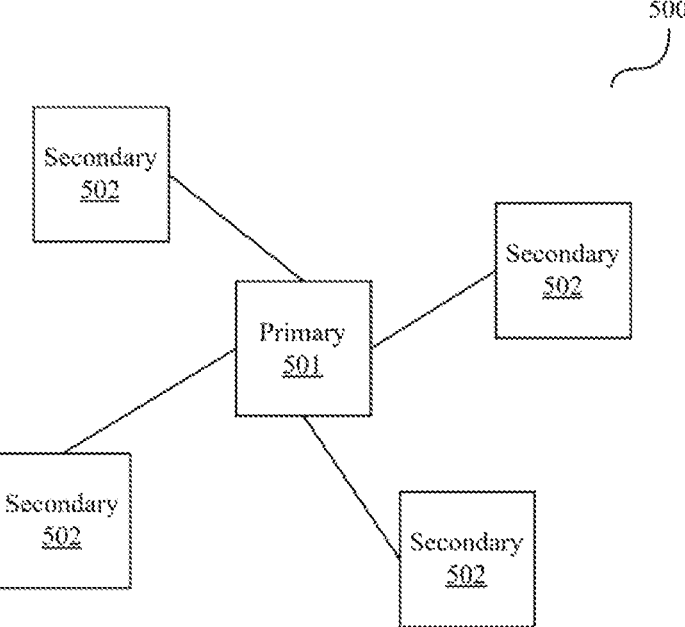
FIG. 5 shows an exemplary illustration of a network topology that communication devices may use.

FIG. 5 shows an exemplary illustration of a network topology that communication devices may use. In accordance with various aspects of this disclosure, a communication protocol, such as BT communication protocol, may be configured according to a network 500 (e.g. piconet for BT networks) operating with a network model having a primary device 501 (e.g. master device), and one or more secondary devices 502 (e.g. slave device). Each secondary device 502 may be communicatively coupled to the primary device over an established connection, collectively forming the network 500. The primary device 501 may coordinate communication through the network 500. The primary device 501 may send and/or receive data from the secondary devices 502, but the secondary devices 502 may not be able to communicate with each other without involvement of the primary device 501

Generally, especially with respect to BT networks, the device that establishes the network may be the primary device 501. It is also possible for the primary device 501 and the secondary devices 502 to change the roles in-between, such that the primary device 501 may become a secondary device and one of the secondary devices 502 may become a primary device in the network. In various examples, the primary device 501 may establish and maintain order and a polling scheme, including designating time slots for the secondary devices 502.

The number of secondary devices 502 in the network may vary. There may be only one secondary device 502 in the network 500. As an example, BT may support that up to seven secondary devices 502 may establish a connection with the primary device 501. Furthermore, the network 500 may be communicatively coupled to another network over at least one of the devices resulting in a scatternet for BT devices. In a scatternet, a device that may be a primary device or a secondary device for one network, may act as a secondary device for another network. In such cases, the device may employ time multiplexing to transmit/send radio communication signals to multiple networks.

In various aspects, especially in BT networks, the polling scheme may include synchronizing clocks of the secondary devices 502 with the primary device 501. When a secondary device 502 operates as a device coupled to multiple networks, the secondary device 502 may set the periods of time in which the secondary device 502 may communicate with the respective primary device 501 of each network.

Each device 501, 502 may have an identifier that may be a unique value predefined. For example, a BT device may have a unique 48-bit identifier (e.g. Bluetooth Address abbreviated as BD ADDR) that is assigned for the device by the manufacturer. In various aspects provided in this disclosure, an identifier may include such unique identifier or other logical addresses and/or identifiers and/or names that are assigned by an entity that may also be the device itself. For example, a BT device may also have a name assigned for the device that may be used, based on use cases, as an identifier.

In order to establish a connection, the primary device 501 may inquire in order to discover other communication devices. For this purpose, the primary device 501 may encode and transmit radio communication signals that may include an identifier with respect to the primary device 501 (e.g. data packets including an inquiry message) over one or more channels, such as channels having different frequencies. In BT communication, the primary device 501 may send an inquiry access code. After the primary device 501 transmitted an inquiry signal, the primary device 501 may listen for one or more responses to be received from a discoverable secondary device 502. In response to receiving such radio communication signal, a secondary device 502 may send a response including radio communication signals that may include data packets including an identifier of the secondary device 502.

Establishing a BT connection between communication devices may be realized once the communication devices are aware of each other. The primary device 501 may receive an indication of a communication device with the response, which the primary device 501 may use to establish a connection using an identifier of a secondary device 502. The primary device 501 and the secondary device 502 may store the identifier of the other communication device in their respective memories. BT technology supports pairing, in which two communication devices that are paired with each other may establish a connection with each other. In accordance with various aspects, a previously defined passphrase (e.g. passkey, password, personal identification number (PIN) that may be designated by the end of the inquiry) may need to be exchanged to establish a previously paired connection between devices to provide a secure connection.

Once the devices have the necessary information (e.g. identifiers, pass-phrase, clock, etc.) obtained through the inquiry phase, the primary device 501 may initiate a paging procedure, in which the primary device 501 may transmit radio communication signals that are encoded based on the obtained information with respect to the secondary device 502. In response to a series of exchanged messages according to the paging procedure, that may include the identifier of the secondary device 502, a connection may be established between the primary device 501 and the secondary device 502.

In accordance with various aspects of this disclosure, communication devices may exchange data in various modes. For example, BT communication may support a mode in which asynchronous connection-less (ACL) protocol is used. The ACL protocol may include exchanging data frames between communication devices over an established communication, in which the data frames are designated for the purpose of exchanging data. ACL protocol may support retransmissions. BT communication may further support a mode in which a synchronous connection-oriented (SCO) protocol is used. SCO protocol may, in particular, be suitable for exchanging real-time information such as audio or video data. In SCO, retransmissions are not used, but forward error correction may be supported.

Figure 6:
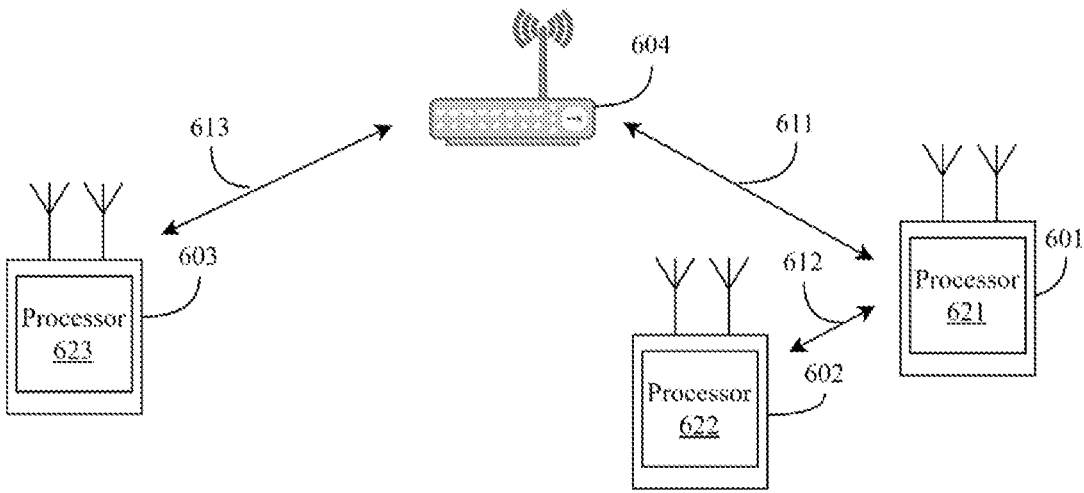
FIG. 6 shows an exemplary illustration of connections between communication devices.

FIG. 6 shows an exemplary illustration of connections between communication devices in accordance with various aspects of this disclosure. The illustration depicts a first communication device 601, a second communication device 602, a third communication device 603, and a further communication device depicted as an access point (AP) 604. The first communication device 601 may establish a first connection 611 with the AP 604 to exchange data over a communication channel. The first communication device 601 may further establish a second communication 612 to exchange data with the second communication device 602. The third communication device 603 may establish a third connection 613 with the AP 604. The third communication device 603 may further establish a connection with the second communication device 602.

In accordance with various aspects of this disclosure, communication devices, especially the first communication device 601, the second communication device 602, and the third communication device 603 may be configured to establish a connection and communicate according to a first communication protocol. Furthermore, any communication devices that communicate with the AP 604 may be configured to establish a connection and communicate according to a second communication protocol. In a practical example, the first communication protocol may be according to a technology (e.g. Bluetooth, IEEE 802.15) that provides less coverage area than a technology that is governed by the second communication protocol (e.g. WLAN). Accordingly, at least the first communication device 601 and the third communication device 603 may be, or may include, a communication device as exemplarily described with respect to FIG. 4. In various examples, the second communication device 602 and the AP 604 may further include a communication device as exemplarily described with respect to FIG. 4.

In this illustrative example, the first connection 611, the second connection 612, and the third connection 613 may have been established according to the respective communication protocol of the respective connection. The first communication device 601 may include a processor 621 that may operate based on information indicating the proximity of the second communication device 602 to the first communication device 601. The first communication device 601 may obtain the information indicating the proximity as provided in this disclosure, exemplarily based on sensor data, or one or more measurements made by a measurement circuit of the first communication device 601 with respect to radio communication signals received from the second communication device 602 (e.g. RSSI).

Based on the information indicating the proximity, it may be desirable for the first communication device 601 to exchange data with the second communication device 602 using another means, as the second connection 612 may be ceased because of the loss of radio communication signals as a result of increased proximity. In this illustrative example, at least one of the first communication device 601 or the second communication device 602 may be a mobile device, hence the distance between devices may change in time. Therefore, the first communication device 601 may determine to hand over the second connection 612 to another communication device, so that the second communication device 602 may still exchange data with the another communication device, in a manner that the exchanged data between the second communication device 602 and the another communication device includes the data to be exchanged between the first communication device 601 and the second communication device 602.

In accordance with various aspects of this disclosure, the first communication device 601 and the second communication device 602 may be configured to exchange data over an established session to exchange the data. Accordingly, once the first communication device 601 determines to hand over the second connection 612 established to exchange data with the second communication device 602 over an established session to another communication device, the another communication device may relay data with respect to the established session, that is to be exchanged between the first communication device 601 and the second communication device 602 in-between.

In this illustrative example, the first communication device 601 may exchange data with the second communication device 602 according to the first communication protocol. The first communication device 601 may also perform communication according to the second communication protocol, however, the second communication device 602 may desire not to adjust the current communication protocol that the second communication device 602 may use to exchange data with the first communication device 601. In various examples, the second communication device 602 may not be configured to communicate according to the second communication protocol, or lack components with respect to the second communication protocol, or may not prefer to use the second communication protocol to exchange data for the respective session due to various reasons (e.g. power constraints). Hence, it may be desired for the second communication device 602 to still use the first communication protocol to send or receive data for the established session to exchange data with the first communication device 601.

In this illustrative example, the first communication device 601 may exchange data with the third communication device 603 according to the second communication protocol. The third communication device 603 may also perform communication according to the first communication protocol, however, the third communication device 603 may not be within proximity allowing a connection according to the first communication protocol. Similar to the case between the first communication device 601 and the second communication device 602, the third communication device 603 may exchange data with the second communication device 602 according to the first communication protocol.

Therefore, unless indicated otherwise, the first communication device 601 may transmit/receive data to/from the second communication device 602 according to the first communication protocol, and the first communication device 601 may transmit/receive data to/from the third communication device 603 according to the second communication protocol. Unless indicated otherwise, the third communication device 603 may transmit/receive data to/from the second communication device 602 according to the first communication protocol, and the third communication device 603 may transmit/receive data to/from the first communication device 601 according to the second communication protocol. The data exchanged between communication devices are to be encoded/decoded with respect to the respective communication protocol used between the respective communication devices. Each communication device may encode and/or decode data according to communication protocols which the respective communication device may transmit and/or receive data.

Accordingly, the processor 621 may determine to hand over the established connection with the second communication device 602 (the second connection 612) based on the information indicating the proximity (i.e. distance) the second communication device 602 to the first communication device 601. As provided in various examples in this disclosure, the processor 621 may determine to hand over the established connection by applying various schemes to the information indicating the proximity, such as applying a predefined threshold with respect to the information, tracking the proximity information over a plurality of instances of time or a period of time, etc. For example, the processor 621 may determine to hand over the established connection when the RSSI of the radio communication signal received from the second communication device 602 is below a predefined threshold.

Especially in various use cases, in which the data exchanged between the first communication device 601 and the second communication device 602 includes time-sensitive information, such as audio data, video data, real-time sensor data, etc., it may be desirable to hand over the connection substantially before experiencing a disconnection due to increased proximity between devices with an intention to maintain substantially seamless communication. Therefore, it may be preferable to determine the handover before experiencing a disconnection to exchange data with respect to the established session. In other words, it may be preferable to determine to hand over of an established connection that is still active (the data is being exchanged). For this purpose, the parameters that the processor 621 may use to determine the handover (e.g. the threshold, the rate of change in time, etc.) may be arranged according to various aspects, such as the proximity to other possible communication devices operating in the environment, communication mode (e.g. BR mode, EDR mode, BLE mode) used with the respective communication protocol, the range defined for the communication protocol, etc.

The processor 621 may encode a message indicating the handover of the second connection for a transmission to the another communication device. In accordance with various aspects of this disclosure, the processor 621 may encode the message and transmit radio communication signals according to the second communication protocol, which may be configured to support a larger coverage area than the first communication protocol. In this illustrative example, the encoded message may provide an indication for other communication devices that the first communication device 601 intends to hand over a connection according to the first communication protocol. The encoded message may include suitable information to provide information with respect to the intended handover.

For example, the encoded message may include an indication of the first communication protocol, so that other communication devices may be aware of the respective communication protocol of the intended handover and establish their connection according to the indicated communication protocol. Furthermore, the encoded message may include information with respect to the second communication device 602. For example, the encoded message may include an identifier of the second communication device 602, so that other communication devices may check whether they can establish a connection with the second communication device 602. The encoded message may further include further information, such as an identifier of the first communication device 601 used for the first communication protocol, further information used by the first communication device 601 to establish the connection with the second communication device 602 (e.g. clock information, pass-phrase, etc.), an identifier of the session established to exchange data, etc.

Furthermore, once the first communication device 601 performs various functions to hand over the second connection 612 configured to exchange data for the established session, the second communication device 602 may still remain connected to the first communication device 601 in a case where the proximity between the first communication device 601 and the second communication device 602 is not large enough (e.g. based on the information indicating proximity) to cut off the second connection 612. For such cases, it may be desirable to cease the second connection 612 for various reasons, such as power consumption or releasing respective resources designate to exchange data for the established session, after encoding the message.

The first communication device 601 may transmit the encoded message in a suitable configuration. For example, the processor 621 may encode the message as a broadcast message, in which the first communication device 601 may transmit the encoded message as a broadcasted signal over a predefined frequency band to other communication devices. The first communication device 601 may encode the message in a configuration to be broadcasted within the radio communication network that the AP 604 controls according to the second communication protocol. Accordingly, the encoded message may be delivered to other nodes (e.g. other communication devices including the third communication device 603) of the radio communication network.

In various examples, a memory of the first communication device 601 may store information indicating other communication devices that the first communication device 601 may hand over an established connection to. Such information may include various types of identifiers for other communication devices (e.g. medium access control (MAC) address, internet protocol (IP) address, device names, BD ADDR, etc.). Accordingly, the first communication device 601 may encode the message for transmission to other communication devices based on the stored information indicating other communication devices that are eligible or designated to establish a connection according to the first communication protocol. In various examples, the first communication device 601 may maintain such information by previously exchanging information with other communication devices.

In this illustrative example, one of the other communication devices may be the third communication device 603. The third communication device 603 may receive the radio communication signal that the first communication device 601 transmits indicating the handover. The processor may decode the message transmitted by the first communication device 601, in which the message indicates to the third communication device 603 that the first communication device 601 intends to hand over the second connection 612 according to the first communication protocol. Based on the decoded message, the third communication device 603 may establish a connection with the second communication device 602 according to the first communication protocol.

The third communication device 603 may establish the connection with the second communication device 602 in a manner that is suitable to the second communication protocol. The third communication device 603 may initially attempt to establish a connection, as it may not be possible for the third communication device 603 to establish a connection. In this illustrative example, in which the first communication protocol is BT, the third communication device 603 may initially attempt to establish a connection by performing an inquiry. For this purpose, the processor 623 of the third communication device 603 may encode an inquiry message and transmit radio communication signals including the inquiry message, as exemplarily provided in this disclosure.

The decoded message received from the first communication device 601 may include the identifier of the second communication device 602. The processor 623 may determine whether the second communication device 602 is communicable (e.g. within proximity that a connection may be established) by checking whether an inquiry response message received in response to the transmitted inquiry message includes information indicating that the second communication device 602 has transmitted an inquiry message. For example, the processor 623 may check if the identifier of the second communication device 602 that the decoded message includes is one of the identifiers that the third communication device 603 has received with one or more inquiry responses.

In various examples, the processor 623 may perform the inquiry multiple times at a plurality of instances of time over until the third communication device 603 discovers the second communication device 602, or for a predefined period of time. In a case that the processor 623 is not able to discover the second communication device 602, the processor 623 may encode a failure message for a transmission to the first communication device 601. The failure message may provide an indication to the first communication device 601 that the third communication device 603 has failed to establish a connection with the second communication device 602. In various examples, the processor 623 may also encode a handover request message that may provide an indication to the first communication device 601 that the second communication device 602 is communicable for the third communication device 603 and the third communication device 603 may take over the connection to transfer (i.e. relay) data with respect to the established session according to the first communication protocol.

The third communication device 603 may also have received information of the second communication device 602 to establish a connection, for example after a prior successful inquiry procedure, or in various examples directly via the decoded message received from the first communication device 601. The third communication device 603 may also include a memory that stores information required to establish a connection with other communication devices according to the first communication protocol. Based on the decoded message received from the first communication device 601, the processor 623 may receive the information required to establish a connection with the second communication device 602 from its memory.

The third communication device 603 may attempt to establish a connection with the second communication device 602 based on the information to establish the connection and the decoded message. In this illustrative example, in which the first communication protocol is BT, the processor 623 may initiate a paging procedure to establish a connection with the second communication device 602 based on the information required to establish a connection with the second communication device 602 stored in the memory. Once the processor 623 has established a connection with the second communication device 602, the processor 623 may encode a response message for a transmission to the first communication device 601. The response message may indicate that the second communication device 602 is communicable for the third communication device 603 and the third communication device 603 may take over the connection to transfer (i.e. relay) data with respect to the established session according to the first communication protocol.

The second communication device 602 may be configured to have an established connection with at least two other communication devices according to the first communication protocol. In accordance with various aspects of this disclosure, the second communication device 602 may be a multipoint device (e.g. a multipoint BT device) capable to connect multiple devices at the same time. The second communication device 602 may include multiple transceiver circuits and/or antennas to communicate with multiple devices simultaneously.

In various examples, the processor 623 may attempt to obtain proximity information indicating a proximity of the second communication device 602 to the third communication device 603, for example as provided in this disclosure. For this purpose, the third communication device 603 may obtain the proximity information based on sensor data, or based on the output of its measurement circuit. Based on the obtained proximity information, the processor 623 may determine to attempt to establish a connection with the second communication device 602 after a predefined period of time (e.g. the signal strength is still low), or the processor 623 may encode a failure message for a transmission the first communication device 601.

The third communication device 603 may measure radio communication signals received from the second communication device 602 at the inquiry procedure or the paging procedure as described in this disclosure. It may be desirable to perform measurements of radio communication signals received at the inquiry procedure, especially when there may be further communication devices that may establish a connection with the second communication device 602 in the environment for the purpose of providing an optimal connection to the second communication device 602 to exchange data with respect to the established session. For this purpose, the third communication device 603 may provide the obtained proximity information with a message to the first communication device 601, for example within the response message.

In an example, the processor 623 may encode a message to discover communication devices (e.g. inquiry message) in the vicinity according to the first communication protocol. The third communication device 603 may accordingly transmit radio communication signals indicating for other communication devices to provide a response. The processor 623 may control the measurement circuit of the third communication device 603 to perform measurements in response to the inquiry message. The processor 623 may obtain proximity information for at least the second communication device 602 based on the measurement results (e.g. RSSI). Then, based on the obtained proximity information, or based on a received message from the first communication device 601 that is received in response to a transmitted response message including the obtained proximity information, indicating a confirmation for the first communication device 601, the processor 623 may establish the connection with the second communication device 602.

The processor 623 may establish the connection with the second communication 602 according to the first communication protocol, and control various circuits (e.g. transceiver circuit, measurement circuit, etc.) based on the decoded data received from the first communication device 601 as exemplarily provided in this disclosure to establish the connection. In response to the connection established between the third communication device 603 and the second communication device 602, the processor 623 may encode a handover request message indicating the established connection with the second communication device 602 according to the second communication protocol. The third communication device 603 may transmit the encoded message to the first communication device 601 according to the second communication protocol (e.g. WLAN).

The first communication device 601 may receive radio communication signals including the handover request message from the third communication device 603 and the processor 621 may decode received handover request message. The first communication device 601 may encode a handover response message including an indication that the second connection 612, which may be used for the established session to exchange data between the first communication device 601 and the second communication device 602 is to be handed over to the third communication device 603 according to the second communication protocol. The first communication device 601 may transmit the handover response message to the third communication device 603 according to the second communication protocol.

In various examples, the handover response message may include further information that the third communication device 603 may use for relaying data (transmitting and/or receiving data) between the first communication device 601 and the second communication device 602. For example, the handover response message may include the session identifier of the session to exchange data between the first communication device 601, and the second communication device 602. In various examples, the handover response message may further include various configuration parameters to configure the relaying role of the third communication device 603, such as a period of time in which the third communication device 603 is expected to maintain the connection with the second communication device 602, configuration parameters of the first communication protocol to be used with the second communication device (e.g. data frame type (SOC, ACL, etc.), type of data to be exchanged between entities, etc.

Furthermore, the first communication device 601 may accordingly set the third communication device 603 as a relay communication device that acts as a relay to exchange information with the second communication device 602. Accordingly, the first communication device 601 may encode data to be transmitted to the second communication device 602 according to the second communication protocol for a transmission to the third communication device 603. The first communication device 601 may encode data with respect to the established session with the second communication device 602 according to the first communication protocol to the third communication device 603 according to the second communication protocol. Similarly, the first communication device 601 may decode data received from the third communication device 603 which the data is received and decoded according to the second communication protocol. The received data includes the data that the second communication device 602 had transmitted according to the first communication protocol.

Once the second connection 612 is handed over to the third communication device 603, the first communication device 601 may receive data for the established session with the second communication device 602 from the third communication device 603. The first communication device 601 may decode data received from the third communication device 603 according to a second communication protocol, in which the received data may include data that the second communication device 602 has encoded for the first communication device 601. The received data may include data with respect to the established session between the first communication device 601 and the second communication device 602. In accordance with various aspects of this disclosure, the established session may include a session to exchange data according to the first communication protocol.

The third communication device 603 may receive the encoded data from the first communication device 601 according to the second communication protocol. The processor 623 may decode the received data according to the second communication protocol. In order to relay the received data to the second communication device 602, the processor 623 may encode the decoded data according to the first communication protocol. In response to encoding the data according to the first communication protocol, the third communication device 603 may transmit the data that is encoded according to the first communication protocol to the second communication device 602 according to the first communication protocol.

Similarly, the third communication device 603 may receive the encoded data from the second communication device 602 according to the first communication protocol. The processor 623 may decode the received data according to the first communication protocol. In order to relay the received data to the first communication device 601, the processor 623 may encode the decoded data according to the second communication protocol. In response to encoding the data according to the second communication protocol, the third communication device 603 may transmit the data that is encoded according to the second communication protocol to the first communication device 601 according to the second communication protocol.

In various examples, in response to receiving data with respect to the established session between the first communication device 601 and the second communication device 602 from one of the first communication device 601 and/or the second communication device 603, the processor 623 may encode an acknowledgment message for a transmission to the first communication device 601 according to the second communication protocol. The acknowledgement message may provide an indication for the first communication device 601 to cease the established connection between the first communication device 601 and the second communication device 602, as it may be desirable to avoid allocation of resources for the established session over the established connection between the first communication device 601 and the second communication device 602. The third communication device 603 may transmit the acknowledgement message to the first communication device 601.

The first communication device 601 may receive the acknowledgement message from the third communication device 603. The processor 621 may decode the acknowledgement message received from the third communication device 603, and in response to the acknowledgement message, the processor 621 may cease the connection between the first communication device 601 and the second communication device 602.

Figure 7:
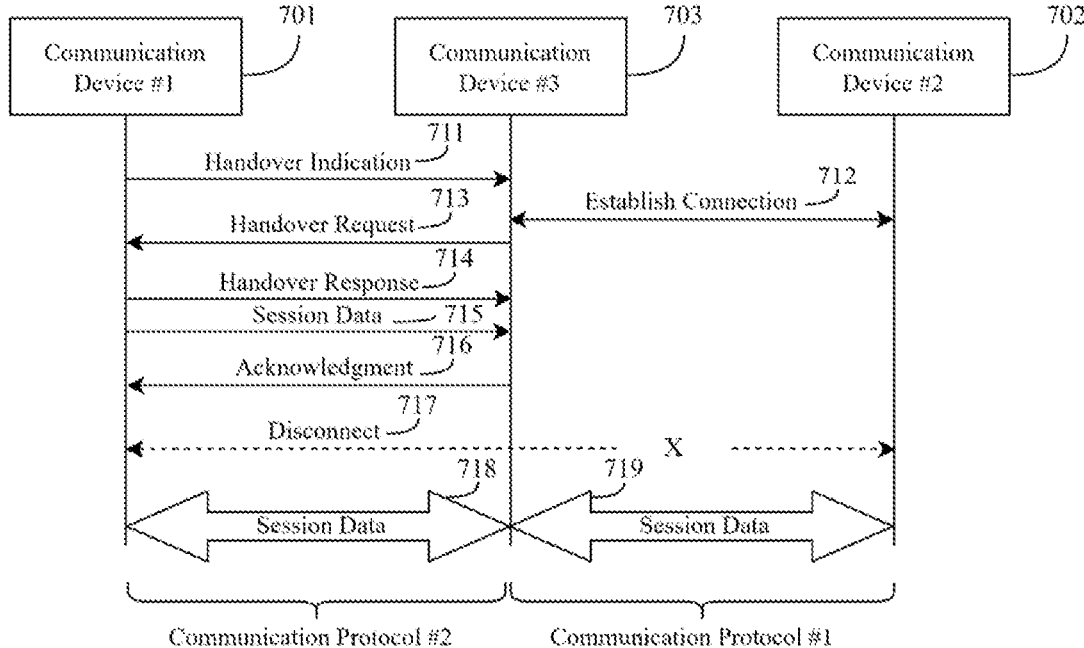
FIG. 7 shows an illustration with respect to information exchanged for handover.

FIG. 7 shows an illustration with respect to information exchanged for handover according to various aspects of this disclosure. The illustration includes a first communication device 701 (e.g. the first communication device 601), a second communication device 702 (e.g. the second communication device 602), and a third communication device 703 (e.g. the third communication device 603). As provided in various examples, the first communication device 701 may determine to hand over an established connection with the second communication device 702 that is used to exchange data with respect to an established session to another communication device based on information indicating the proximity between the first communication device 701 and the second communication device 702. The established connection is made according to a first communication protocol.

Based on the output of the determination, the first communication device 701 may send a handover indication 711 indicating an intention to hand over the established connection to exchange data with respect to the established session to other communication devices including the third communication device 703 using a second communication protocol. The third communication device 703 may receive the handover indication 711 sent according to the second communication protocol and establish a connection 712 with the second communication device 702 according to the first communication protocol. In various examples, the third communication device 703 may perform measurements (e.g. RSSI) to obtain proximity information with respect to the proximity between the third communication device 703 and the second communication device 702, and the third communication device 703 may determine to establish the connection 712 based on the result of the measurement (e.g. RSSI greater than a predefined threshold). The third communication device 703 may send a handover request message 713 in response to establishing the connection 712 with the second communication device 702.

The first communication device 701 may send a handover response message 714 as provided in this disclosure. In response to a received handover response message 714, the third communication device 703 may configure parameters for the relay link to be established between the first communication device 701 and the second communication device 703 through the third communication device 703. Furthermore, the first communication device 701 may initiate sending data 715 with respect to the established session between the first communication device 701 and the second communication device 702 to the third communication device 703.

The third communication device 703 may start receiving the session data and store the session data in a buffer memory, as it may be desirable to provide buffered session data in case the established connection between the first communication device 701 and the second communication device 702 disconnects before the handover is complete. In such case, the third communication device 703 may send session data that is stored in the buffer memory as soon as the handover is complete. Furthermore, the third communication device 703 may send an acknowledgment message 716 to the first communication device 701, and the first communication device 701 may cease 717 the established connection between the first communication device 701 and the second communication device.

After the handover is complete, the session data, that is configured to be exchanged between the first communication device 701 and the second communication device 702 over the established session, is relayed through the third communication device 703. For this purpose, for information to be transmitted by the first communication device 701 to the second communication device 702 with respect to the established session, the first communication device 701 may encode data according to the second communication protocol and send the encoded data according to the second communication protocol to the third communication device 703. The third communication device 703 receives the encoded data according to the second communication protocol, and based on the received data, the third communication device 703 may encode data according to the first communication protocol and send the data according to the first communication protocol to the second communication device 702. The third communication device 703 may decode data received from the first communication device 701 which the data is received and decoded according to the second communication protocol. The received data may include the data that the first communication device 701 had transmitted according to the second communication protocol.

Similarly, for information to be transmitted by the second communication device 702 to the first communication device 701 with respect to the established session, the second communication device 702 may encode data according to the first communication protocol and send the encoded data according to the first communication protocol to the third communication device 703. The third communication device 703 receives the encoded data according to the first communication protocol, and based on the received data, the third communication device 703 may encode data according to the second communication protocol and send the data according to the second communication protocol to the first communication device 701.

Figure 8A:
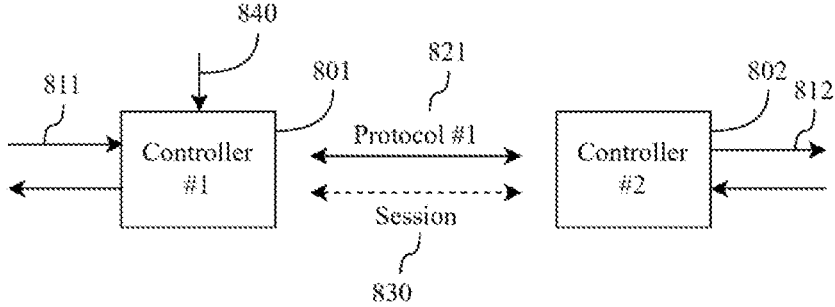
FIG. 8A shows a diagram illustrating exemplary management of the data to be exchanged between communication devices.

FIG. 8A shows a diagram illustrating exemplary management of the data to be exchanged between communication devices in accordance with various aspects of this disclosure. A first controller 801, which may be a controller of a first communication device (e.g. the first communication device 701), and a second controller 802, that may be a controller of a second communication device (e.g. the communication device 702) may be configured to control the communication according to various aspects of this disclosure. In various examples, controllers may be implemented or comprised by one or more processors of the respective communication device. In various examples, the controllers may also include at least a portion of a software (e.g. an application, an operating system, an embedded software, etc.) that are configured to implement various functions according to various aspects of this disclosure on or for the respective communication device. In various examples, the first controller 801 may include, or may be coupled to, modules with respect to at least two communication protocols (e.g. the WLAN module 403, the BT module 404).

This illustrative example will be explained in a constellation that the first communication protocol may be a BT protocol and the second communication protocol may be a WLAN protocol. The first controller 801 may receive instructions to exchange data with the second communication device according to the first communication protocol. In response to received instructions, the first communication device may establish a BT connection 821 with the second communication device to exchange data with the second communication device over an established session 830.

Once the connection 821 and the session 830 are established between communication devices, the first controller 801 may receive and/or transmit and/or access 811 data from a data source. For example, the data may include data processed and/or used by an application running on the first communication device that may be configured to receive audio input data from the second communication device and provide audio output data to the second communication device over the BT connection, and the data source may be the running application. In this example, the first communication device may be a computer that has established the BT connection to the second communication device that may be a BT headset. The application may include an application to communicate with another user, such as a messenger application, a conference call application, a voice over IP application, a voice chat application, etc. In accordance with various aspects of this disclosure, the first controller 801 may include, or may control, a data interface that is configured to transfer data from/to the data source (e.g. an application).

Based on the received instructions, the first controller 801 may perform various functions to encode or decode data according to the BT protocol. Such functions may include encoding and transmitting data according to the BT protocol, packetizing data received from the data source 811 for a BT transmission, de-packetizing BT data received from the second communication device to obtain data for providing the data source 811, controlling a transceiver circuit to transmit and/or receive BT communication signals with the BT connection 821, etc.

Similarly, the second controller 802 may perform various functions to encode or decode data according to the BT protocol. Such functions may include encoding and transmitting data according to the BT protocol, packetizing data received from the data source 812 for a BT transmission, de-packetizing BT data received from the second communication device to obtain data for providing the data source 812, controlling a transceiver circuit to transmit and/or receive BT communication signals with the BT connection 821, etc.

In accordance with various aspects of this disclosure, the first controller 801 may further receive and/or access information 840 indicating the proximity between the first communication device and the second communication device. The first controller 801 may constantly, periodically, or aperiodically monitor the proximity between the communication devices based on the information 840. The first controller 801 may determine to hand over the BT connection 821 that is established to exchange data between the first communication device and the second communication device according to the established session.

Figure 8B:
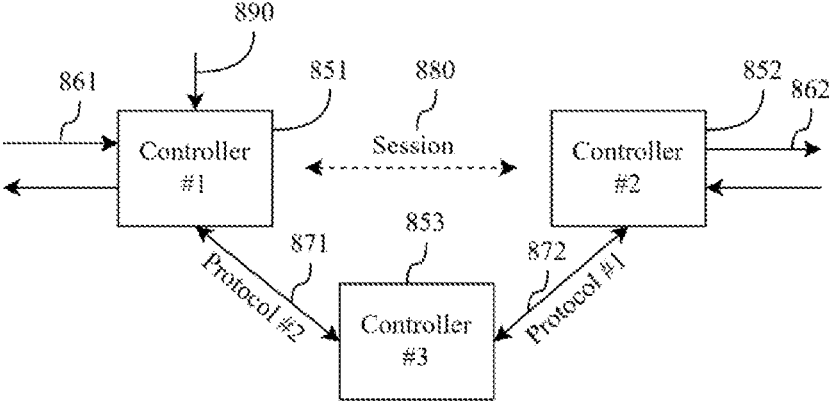
FIG. 8B shows a diagram illustrating exemplary management of the data to be exchanged between communication devices.

FIG. 8B shows a diagram illustrating exemplary management of the data to be exchanged between communication devices after the handover. The illustration includes similar elements similar to FIG. 8A, including a first controller 851 of a first communication device, a second controller 852 of a second communication device, an established session 880 between the first communication device and the second communication device to exchange data, in which the first controller 851 may have an input 890 to receive information indicating the proximity between the first communication device and the second communication device.

In this illustrative example, a third communication device is involved to relay data that is configured to be exchanged according to the established session 880 between the first communication device and the second communication device. The third communication device may include a third controller 853 that is configured to perform various functions to encode or decode data according to the BT and the WLAN protocol. Such functions may include encoding and transmitting data received from the second communication device according to the BT protocol, packetizing data received from the first communication device for a BT transmission, decoding BT data received from the second communication device according to the BT protocol, de-packetizing BT data received from the second communication device to obtain data for encoding the obtained data according to the WLAN protocol for a WLAN transmission to the first communication device, encoding and transmitting data received from the first communication device according to the WLAN protocol, packetizing data received from the second communication device for a WLAN transmission, decoding data received from the first communication according to the WLAN protocol, de-packetizing WLAN data received from the first communication device to obtain data for encoding the obtained data according to the BT protocol for a BT transmission, controlling transceiver circuits to transmit and/or receive BT communication signals with the BT connection 872, and transmit and/or receive WLAN communication signals with the WLAN connection 871, etc.

Accordingly, after the handover is complete, when the first communication device intends to send data with respect to the established session 880 (to the second communication device), the first controller 851 may receive source data with respect to the established session 880 and encode the source data according to the WLAN protocol. The first communication device transmits WLAN communication signals including the data with respect to the established session 880 to the third communication device over the WLAN connection 871. Furthermore, the first communication device may receive WLAN data from the third communication device over the WLAN connection 871, in which the WLAN data may include data with respect to the established session 880. The first controller 851 may decode the WLAN data and obtain the data with respect to the established session 880. The first controller 851 may provide the data with respect to the established session 880 toward the data source. In various examples, the data source may include an interface to receive and transmit data with respect to the established session.

Similarly, after the handover is complete, when the second communication device intends to send data with respect to the established session 880 (to the first communication device), the second controller 852 may receive source data with respect to the established session 880 and encode the source data according to the BT protocol. The second communication device may transmit BT communication signals including the data with respect to the established session 880 to the third communication device over the BT connection 872. Furthermore, the second communication device may receive BT data from the third communication device, in which the BT data may include data with respect to the established session 880. The second controller 852 may decode the BT data and obtain the data with respect to the established session 880. The second controller 852 may provide the data with respect to the established session 880 towards the data source. In various examples, the data source may include an interface to receive and transmit data with respect to the established session.

The third controller 853 of the third communication device acting as the relay may receive WLAN data with respect to the established session 880 from the first communication device over the WLAN connection 871, and decode the WLAN data to obtain data with respect to the established session 880. The third controller 853 may further encode the obtained data according to the BT protocol and the third communication device may transmit BT communication signals including the data with respect to the established session 880 to the second communication device over the BT connection 872. Similarly, the third controller 853 may receive BT data with respect to the established session 880 from the second communication device over the BT connection 872, and decode the BT data to obtain data with respect to the established session 880. The third controller 853 may further encode the obtained data according to the WLAN protocol and the third communication device may transmit WLAN communication signals including the data with respect to the established session 880 to the second communication device over the WLAN connection 871.

Figure 9:
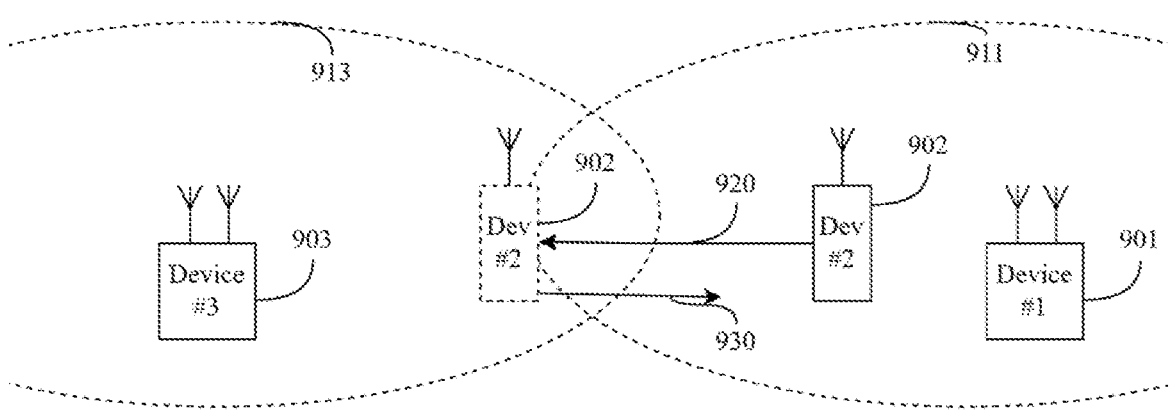
FIG. 9 shows an exemplary illustration including communication devices.

FIG. 9 shows an exemplary illustration including communication devices with respect to various aspects of this disclosure. A first communication device 901 (e.g. the first communication device 701) may have established a BT connection with a second communication device 902 (e.g. the communication device 702) to exchange BT data. In this illustrative example, the first communication device may maintain a BT connection with another BT communication device within a first coverage area 911. Once the first communication device 901 has established a BT connection with the second communication device 902, the first communication device 901 may monitor the proximity of the second communication device 902 continuously, periodically, or aperiodically (e.g. when an instruction is received to send BT data to the second communication device 902). In this illustrative example, the first communication device 901 may measure received BT communication signals to obtain RSSI.

The second communication device 902 may be a mobile device, and the second communication device 902 may move 920 towards the end of the first coverage area 911 while the established BT connection is still active. As the second communication device 902 moves further away from the first communication device 901 outwards the first coverage area 911, the processor of the first communication device 901 may detect a decrease at the RSSI values. As indicated the processor of the first communication device 901 may use various schemes to determine to hand over the established BT connection based on the RSSI values, such as applying a threshold, monitoring the change introduced between one or more measurements, or over time, etc. Based on the obtained RSSI values, the processor of the first communication device 901 may determine to hand over the established BT connection to a third communication device 903, as exemplarily provided in this disclosure.

For example, the first communication device 901 may be a computer (e.g. a PC) located in a room in an office or home environment. The second communication device 902 may be a BT headset that a user may be wearing. The user may walk around in the environment while the BT headset exchanges audio data with the computer. The third communication device 903 may be another computer in another room of the environment, or an access point including a BT module (e.g. a WLAN access point including a BT module). The first communication device 901 and the third communication device 903 may have further established a WLAN connection in between (e.g. an ad-hoc connection or over an access point configured to provide WLAN radio access service within the environment).

Accordingly, the first communication device 901 may initiate the handover procedure by exchanging messages with the third communication device 903 as exemplarily provided in this disclosure and the third communication device 903 may establish a BT connection with the second communication device 902 when the second communication device enters within a second coverage area 913 in which the third communication device 903 can establish a BT connection. The third communication device 903 may buffer audio data received from the first communication device 901 in response to receiving audio data from the first communication device 901, in which the audio data is to be transmitted to the second communication device 902. With the completion of the handover procedure, the third communication device 903 may begin to relay data between the first communication device 901 and the second communication device 902, as exemplarily provided in this disclosure.

Furthermore, the user may decide to leave the second coverage area 913 and move towards the first coverage area 911 after the third communication device 903 has established the BT connection with the second communication device 902 and initiated to relay data between the first communication device 901 and the second communication device 902. Similar to proximity determination that the first communication device 901 had made, the third communication device 903 may determine to hand over the BT connection with the second communication device 902 to another communication device. In this illustrative example, the third communication device 903 may estimate that the second communication device 902 may leave the second coverage area 913 based on the information indicating the proximity (e.g. RSSI) in a similar manner, and encode a handover termination message to be transmitted to the first communication device 911 over the WLAN connection. The handover termination message may provide an indication that the third communication device 913 intends to hand over the established BT connection back to the first communication device 911 (or to another communication device).

The first communication device 901 may receive the handover termination message and in response to the received handover termination message, the first communication device 901 may attempt to establish a BT connection with the second communication device 902. The first communication device 901 may attempt to establish the BT connection with the second communication device, as exemplarily provided in this disclosure with respect to FIG. 6 (e.g. through discovery and/or paging procedures). The first communication device 901 may encode a termination message for a WLAN transmission to the third communication device 903 in response to the established BT connection with the second communication device 902. The first communication device 901 may begin to exchange audio data directly with the second communication device 902, once the first communication device 901 has established the BT connection with the second communication device 902 again. Meanwhile, the third communication device may cease the established BT connection with the second communication device 902 and/or the established WLAN connection with the first communication device 901 in response to receiving the termination message.

In various examples, a first communication device that hands over an initial established connection with a second communication device according to a first communication protocol, and a third communication device that may take over the established connection by relaying information according to a second communication protocol may be configured to perform communication with respect to the handover procedure as provided in this disclosure according to a server-client relationship. For example, the first communication device may be a server (e.g. handover server) device providing, controlling, and/or maintaining the handover procedure and the third communication device may be a client device (e.g. handover client) relaying data between the server device and a further device.

Furthermore, there may be more than one communication device that may be configured to communicate according to the first communication protocol and a second communication protocol and the first communication device may hand over the established connection with the second communication device according to the first communication protocol. In accordance with various aspects of this disclosure, a first communication device may select a communication device that the first communication device may hand over the established connection according to the first communication protocol from a plurality of communication devices.

Figure 10:
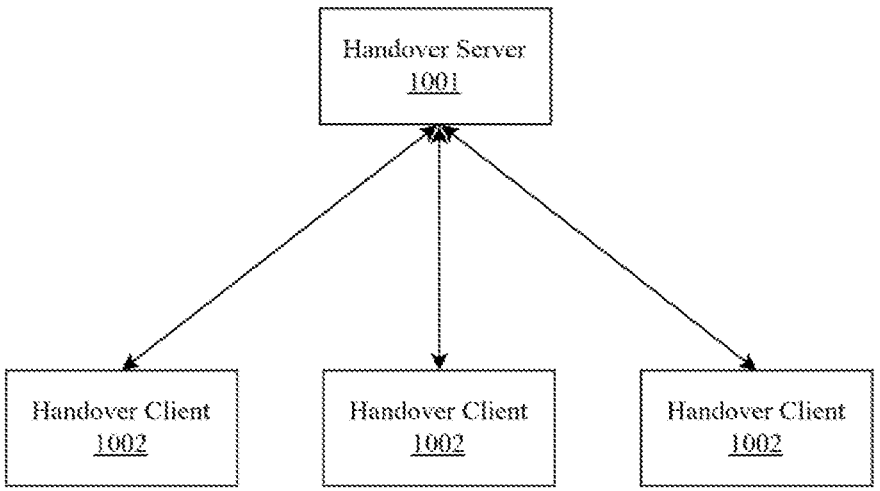
FIG. 10 shows an example of an illustration including a communication device that may hand over an established connection to multiple communication devices.

FIG. 10 shows an example of an illustration including a communication device that may hand over an established connection to multiple communication devices. A handover server 1001 (e.g. the first communication device 701) that may be configured to hand over an established connection with another communication device (e.g. the second communication device 701) according to various aspects provided in this disclosure to a further communication device (e.g. the third communication device 703). In this illustrative example, there may be multiple handover clients 1002 that are configured to act as a relay exchanging data between the handover server 1001 and the another communication device. In various examples, the handover server 1001 may select one of the multiple handover clients 1002 to hand over the established connection.

The handover server 1001 may include a memory to store client information with respect to each handover client 1002 that may include an identifier to identify each handover client 1002, address information (e.g. an IP address, a MAC address) to exchange information with the respective handover client 1002, communication protocols supported by each handover client 1002, a distance between each handover client 1002 and the handover server 1001, a location of a handover client 1002, a direction relative to the handover server 1001 for the handover client 1002, etc.

In various examples, the handover server 1001 may select one of the handover clients 1002 to hand over the established connection with the another communication device based on the client information stored in the memory. For example, the handover server 1001 may determine a direction with respect to the movement of the another communication device based on measurements. For example, the handover server 1001 may include a plurality of antennas that are configured to measure received radio communication signals from the another communication device, which the radio communication signals are received at a plurality on instances of time. Based on the measurements, the handover server 1001 may estimate a direction of the movement for the another communication device that is mobile, and the handover server 1001 may select one of the handover clients 1002 based on the estimated direction and the stored client information.

Furthermore, the handover server 1001 may select the handover client 1002 from the plurality of handover clients 1002 based on the proximity of each handover client 1002 to the another communication device. In one example, each handover client may provide proximity information indicating the proximity of the another communication device to the respective handover client 1002 in a continuous, periodic, or aperiodic manner. It may be desirable to employ a selection inquiry before handing over the established connection in order to make an optimum selection to hand over the connection for a handover client, while reducing the network overhead.

In some examples, the handover server 1001 may communicate with the another communication device to select the handover client 1002. For this purpose, the handover server 1001 may also send an indication (e.g. a signal or a message) indicating anticipation of the handover to the another communication device. The handover server 1001 may receive an indication indicating one of the handover clients 1002 from the another communication device. For example, in a scenario that the another communication device including a BT headset, the BT headset may receive information indicating the selection of a user (e.g. via a button, a switch, an apparatus on the BT headset) from the user, and provide the corresponding indication to the handover server 1001 using BT communication signals.

For this purpose, the handover server 1001 may encode the message indicating the handover for a transmission according to the second communication protocol to the plurality of handover clients 1002. In various examples, the encoded message may include an indication of a request of proximity information from each handover client 1002. In various examples, the encoded message itself may indicate for the handover clients 1002 to provide proximity information.

In response to a received message, each handover client 1002 may attempt to establish a connection with the another communication device. Especially for this purpose, in case the handover clients 1002 may obtain the proximity information indicating the proximity to the another communication device for each handover client 1002 by performing measurements over with received radio communication signals according to the first communication protocol, it may be desirable to measure radio communication signals received with a discovery operation through the inquiry procedure, as it may not be possible for the another communication device to establish a connection with each handover client 1002. Accordingly, each handover client 1002 may obtain the proximity information and encode a response message including the proximity information for a transmission to the handover server 1001 according to the second communication protocol.

The handover server 1001 may receive response messages from each handover client 1002, and accordingly, select one of the handover clients 1002 based on the proximity information received from the handover clients 1002. For example, the proximity information may include RSSI values and the handover server 1001 may select the handover client 1002 that has the highest RSSI values among the RSSI values received from all handover clients 1002. In various examples, the proximity information may include a normalized RSSI value, as estimation of RSSI values may vary.

In various examples, the handover server 1001 may select one of the handover clients 1002 based on a selection message received from the another communication device. In such example, the selection message may include information indicating a preference of the another communication device with respect to the handover clients 1002 that the handover server 1001 may hand over to. In various examples, the selection message may include an identifier of one of the handover clients 1002. In various examples, the handover server 1001 may communicate with the another communication device by exchanging information and causing the another communication device to send an indication with respect to one of the handover clients 1002.

After the handover server 1001 selects one of the handover clients 1002 to hand over the established connection with the another communication device, the handover server 1001 may perform other functions to hand over the established connection as exemplarily provided in this disclosure. Furthermore, after the handover is complete and the selected handover client 1002 has established a connection with the another communication device to provide functions to relay data exchanged between the handover server 1001 and the another communication device, the selected handover client 1002 may monitor the proximity to the another communication device. In accordance with various aspects of this disclosure, the selected handover client 1002 may also determine to hand over the established connection according to the first communication protocol based on the monitored proximity to the another communication device, as the RSSI value of the communication signals received from the another communication device may decrease.

Based on the proximity to the another communication device, the selected handover client 1002 may encode a handover termination message over the established connection to the handover server 1001 (i.e. a remote server) for a transmission according to the second communication protocol. In such a case, the handover client 1002 may perform the same operations that the handover server 1001 is configured to perform, such as determining to hand over the communication between the handover client 1002 and the another communication device based on the proximity information. In response to receiving the handover termination message, the handover server 1001 may attempt to establish a connection with the another communication device according to the first communication protocol.

Furthermore, or in case the handover server 1001 may not establish a connection with the another communication device in response to received handover termination message, the handover server 1001 may again encode a message indicating the handover for a transmission according to the second communication protocol to the plurality of handover clients 1002, at which each handover client 1002 may again provide proximity information to the handover server 1001 in response to the message, and the handover server 1001 may select one of the handover clients 1002 to hand over the connection.

Figure 11:
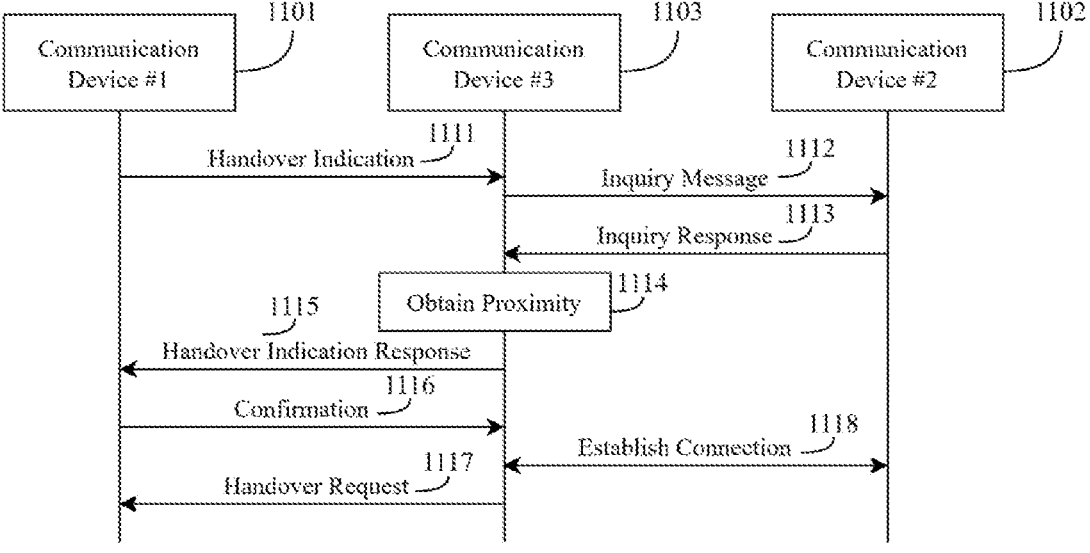
FIG. 11 shows an example of messages exchanged in order to send a handover request message.

FIG. 11 shows an example of messages exchanged in order to send a handover request message. The figure illustrates exemplary messaging between communication devices to hand over as exemplarily provided in this disclosure. In various examples, the messaging may take place between a handover server (e.g. the handover server 1001) and one or more handover clients (e.g. the handover client 1002). Communication devices may include a first communication device 1101 (e.g. the first communication device 701), a second communication device 1102 (e.g. the second communication device 702), and a third communication device 1103 (e.g. the third communication device 703).

The first communication device 1101 may have established a connection with the second communication device 1102 according to a first communication protocol. In accordance with various aspects provided in this disclosure, the first communication device 1101 may monitor the proximity of the second communication device 1102 to the first communication device 1101. Based on the information indicating the proximity, the first communication device 1101 may determine to hand over the established connection between the first communication device 1101, and the second communication device 1102 to another communication device.

The first communication device 1101 may encode a message indicating the determined handover to other communication devices. In this illustrative example, the first communication device 1101 encodes a handover indication message 1111 to indicate the determined handover and sends the handover indication message 1111 to the third communication device 1103 according to a second communication protocol. In various examples, the first communication device 1101 may send the same or similar handover indication message 1111 to a plurality of communication devices including the third communication device 1103 in a similar manner. This illustrative example provides an example of messaging between another communication devices including the third communication device 1103, but the first communication device 1101 may perform the same operations with other communication devices as well, in which the other communication devices may perform functions as provided by the third communication device 1103 in this illustrative example.

Based on the received handover indication 1111, the third communication device 1103 may attempt to detect whether the second communication device 1102 is within a proximity, in which the third communication device 1103 can establish a connection with the second communication device 1102. The third communication device 1103 may discover communication devices that the third communication device 1103 can establish a connection based on the received handover indication 1111. For this purpose, the third communication device 1103 may perform an inquiry procedure according to the first communication protocol. The third communication device 1103 may encode one or more inquiry messages 1112 and transmit the one or more inquiry messages according to the first communication protocol.

The second communication device 1102 may be configured to perform a scan to discover inquiry messages according to the first communication protocol. In response to receiving an inquiry message 1112 from the third communication device 1103, the second communication device 1102 may encode an inquiry response message 1113, that may include an identifier (e.g. BD ADDR), and send the inquiry response message 1113 to the third communication device according to the first communication protocol with radio communication signals.

The third communication device 1103 may receive radio communication signals from the second communication device 1102, which the signals may include the inquiry response message 1113, and the third communication device 1103 may measure the received radio communication signals to obtain 1114 proximity information indicating the proximity of the second communication device 1102 to the third communication device 1103. In various examples, the proximity information may include one or more RSSI values.

Furthermore, in response to detecting that the second communication device 1102 is within a proximity that the third communication device 1103 can establish a connection with, the third communication device 1103 may encode a handover indication response 1115 as a response to the handover indication message 1111 and send the handover indication response 1115 to the first communication device 1101 according to the second communication protocol with an intention to indicate to the first communication device 1101 that the third communication device 1103 can establish a connection with the second communication device according to the first communication protocol. In various examples, the handover indication response 1115 may include the proximity information that the third communication device 1103 has obtained.

The first communication device 1101 may encode a confirmation message 1116 and send the confirmation message 1116 to the third communication device 1103 according to the second communication protocol with an intention to indicate that the third communication device 1103 may attempt to take over the established connection between the first communication device 1101 and the second communication device 1102.

In various examples, and especially in cases in which the first communication device 1101 can receive multiple handover indication responses from multiple communication devices in the environment, in which each multiple communication device may establish a connection with the second communication device 1102 according to the first communication protocol, the first communication device 1101 may select one of the plurality of communication devices to hand over the established connection based on the received handover indication responses including proximity information with respect to respective one of the plurality of communication devices. For this purpose, the first communication device 1101 may select one of the plurality of communication device (e.g. the third communication device 1103 in this illustrative example) that provides the best (e.g.

the highest RSSI value) proximity information. The first communication device 1103 may encode and send a message that is different than the confirmation message 1116 (e.g. a failure message, a hold message, etc.) to communication devices other than the selected communication device according to the second communication protocol.

The third communication device 1103 may establish 1118 a connection according to the first communication protocol with the second communication device 1102 in response to received confirmation message 1116. The third communication device 1103 may send a handover request 1117 to the first communication device 1101 after establishing the connection according to the first communication protocol with the second communication device 1102, and the rest of the handover functions may be performed as exemplary provided in this disclosure.

FIG. 12 shows an example of a method. The method may include determining 1201 to hand over an established connection with a first communication device based on information indicating a proximity of the first communication device to the communication device, wherein the established connection is configured to exchange data between the communication device and the first communication device according to a first communication protocol, encoding 1202 a message indicating the handover of the established connection for a transmission to a second communication device, and encoding 1203 data to be transmitted to the first communication device for a transmission to the second communication device according to a second communication protocol.

FIG. 13 shows an example of a method. The method may include decoding 1301 a received message indicating a handover of an established connection to exchange data between the first communication device and a second communication device according to a first communication protocol, establishing 1302 a connection with the second communication device according to the first communication protocol based on the decoded message, and encoding 1303 data for a transmission to the second communication device using the first communication protocol based on received data received from the first communication device using a second communication protocol.

Figure 14:
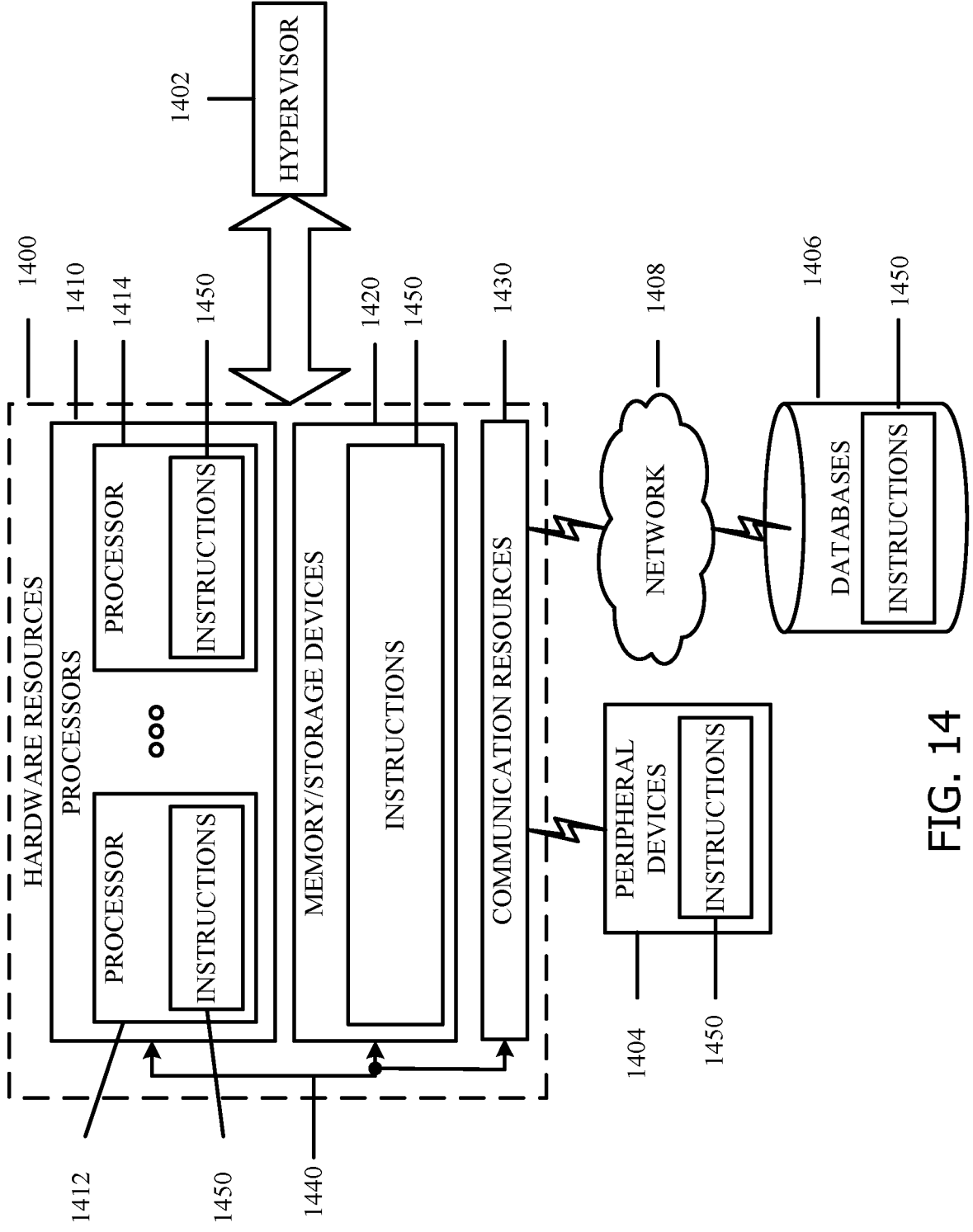
FIG. 14 shows an example of a block diagram illustrating various components.

FIG. 14 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400, such as a communication device (e.g. a computing device) including one or more processors (or processor cores) 1410, one or more memory/storage devices 1420, and one or more communication resources 1430, each of which may be communicatively coupled via a bus 1440 or other interface circuitry. For aspects where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processors 1410 may be, for example, a central processing unit (CPU), a reduced instruction set computing (RISC) processor, a complex instruction set computing (CISC) processor, a graphics processing unit (GPU), a digital signal processer (DSP) such as a baseband processor, an application-specific integrated circuit (ASIC), a field-programmable gate array (FPGA), a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface controllers, components, or other suitable devices to communicate with one or more peripheral devices 1404 or one or more databases 1406 or other network elements via a network 1408. For example, the communication resources 1430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1450 may include software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

The following examples pertain to further aspects of this disclosure.

In example 1A, the subject matter includes a communication device may include: a processor configured to: determine to hand over an established connection with a first communication device based on information indicating a proximity of the first communication device to the communication device, can optionally include that the established connection is configured to exchange data between the communication device and the first communication device according to a first communication protocol; encode a message indicating the handover of the established connection for a transmission to a second communication device; encode data to be transmitted to the first communication device for a transmission to the second communication device according to a second communication protocol.

In example 2A, the subject matter of example 1A, may further include: a transceiver circuit configured to transmit and/or receive radio communication signals. In example 3A, the subject matter of example 2A, can optionally include that the transceiver circuit includes a first circuit configured to receive and/or transmit the radio communication signals according to the first communication protocol and a second circuit configured to receive and/or the transmit radio communication signals according to the second communication protocol. In example 4A, the subject matter of example 2A or example 3A, may further include a measurement circuit configured to measure the received radio communication signals; can optionally include that the processor is configured to obtain the information indicating the proximity based on an output of the measurement circuit. In example 5A, the subject matter of example 4A, can optionally include that the information indicating the proximity includes at least one received signal strength indicator (RSSI).

In example 6A, the subject matter of example 4A or example 5A, can optionally include that the processor is configured to determine to hand over the established connection based on at least two RSSIs. In example 7A, the subject matter of any one of examples 1A to 6A, can optionally include that the first communication protocol includes a Bluetooth protocol; can optionally include that the second communication protocol includes an IEEE 802.11 protocol or a cellular communication protocol. In example 8, the subject matter of any one of examples 1A to 7A, can optionally include that the processor is further configured to cease the established connection with the first communication device after encoding the message. In example 9A, the subject matter of any one of examples 1A to 8A, can optionally include that the processor is further configured to decode a received message in response to the message indicating a response of the second communication device to take over the established connection; can optionally include that the processor is further configured to cease the established connection with the first communication device based on the received message.

In example 10A, the subject matter of any one of examples 1A to 9A, can optionally include that the processor is further configured to encode the message indicating the handover for transmissions to a plurality of second communication devices; can optionally include that the processor is further configured to decode received messages from the plurality of second communication devices received in response to the message; can optionally include that the processor is further configured to hand over the established connection to one of the plurality of second communication devices based on the decoded received messages. In example 11A, the subject matter of example 10A, can optionally include that each received message includes proximity information indicating a proximity of the first communication device to a respective second communication device of the plurality of second communication devices. In example 12A, the subject matter of any one of examples 10A or 11A, can optionally include that the processor is further configured to decode a handover termination message received from the one of the plurality of second communication devices; can optionally include that the handover termination message indicates a request from the second communication device to hand over a connection between the first communication device and the second communication device according to the first communication protocol.

In example 13A, the subject matter of example 12A, can optionally include that the processor is further configured to hand over the connection to another one of the plurality of second communication devices in response to the handover termination message. In example 14A, the subject matter of example 13A, can optionally include that the processor is further configured to encode a second message indicating the determined handover for transmission to the plurality of second communication devices; can optionally include that the processor is further configured to decode second received messages from the plurality of second communication devices in response to the second message; can optionally include that the processor is further configured to determine the another one of the plurality of second communication devices based on the second received messages. In example 15A, the subject matter of any one of examples 10A to 14A, can optionally include that the processor is further configured to decode a selection message received from the first communication device; can optionally include that the processor is further configured to hand over the established connection to one of the plurality of second communication devices based on the decoded selection message.

In example 16A, the subject matter of any one of examples 10A to 15A, can optionally include that the processor is further configured to encode the message indicating the handover for a transmission to a remote server coupled to the plurality of second communication devices. In example 17A, the subject matter of any one of examples 1A to 16A, can optionally include that the processor is configured to decode a handover request message may include a request to take over the established connection from the second communication device; can optionally include that the processor is further configured to encode a handover response message for the second communication device in response to the handover request message, can optionally include that the handover response message includes an indication of an established connection between the first communication device and the second communication device. In example 18A, the subject matter of example 17A, can optionally include that the processor is further configured to encode the data for the transmission to the second communication device according to the second communication protocol in response to the handover response message. In example 19A, the subject matter of any one of examples 1A to 18A, can optionally include that the processor is further configured to decode an acknowledgement message indicating a reception of the encoded data from the second communication device; can optionally include that the processor is further configured to cease the established connection with the first communication device based on the acknowledgement message.

In example 20A, the subject matter of any one of examples 1A to 19A, can optionally include that the processor is further configured to decode a handover termination message received from the second communication device; can optionally include that the handover termination message indicates a request from the second communication device to hand over a connection between the first communication device and the second communication device; can optionally include that the processor is further configured to establish a second connection with the first communication device in response to the handover termination message. In example 21A, the subject matter of any one of examples 1A to 20A, can optionally include that the encoded data includes information that is encoded according to the first communication protocol.

In example 22A, the subject matter of any one of examples 1A to 21A, can optionally include that the encoded data includes at least one of audio data, video data, user data. In example 23A, the subject matter of any one of examples 1A to 22A, may further include a memory configured to store an identifier for the first communication device; can optionally include that the message includes the identifier for the first communication device. In example 24A, the subject matter of any one of examples 1A to 23A, can optionally include that the encoded data includes the identifier for the first communication device. In example 25A, the subject matter of any one of examples 1A to 24A, can optionally include that the memory is further configured to store an identifier for the second communication device; can optionally include that the processor is further configured to encode a message to the first communication device, can optionally include that the message includes the identifier for the second communication device. In example 26A, the subject matter of any one of examples 1A to 25A, can optionally include that the processor is configured to establish a session to exchange the data with the first communication device according to the first communication protocol; can optionally include that the processor is configured to transmit data to be exchanged with respect to the established session with the first communication device to the second communication device.

In example 27A, the subject matter includes a communication device including: a processor configured to: decode a received message indicating a handover of an established connection to exchange data between a first communication device and a second communication device according to a first communication protocol; establish a connection with the second communication device according to the first communication protocol based on the decoded message; encode data for a transmission to the second communication device using the first communication protocol based on received data received from the first communication device using a second communication protocol.

In example 28A, the subject matter of example 27A, can optionally include that the encoded data includes the received data received from the first communication device. In example 29A, the subject matter of example 27A or example 28A, may further include: a transceiver circuit configured to transmit and/or receive radio communication signals. In example 30A, the subject matter of example 29A, can optionally include that the transceiver circuit includes a first circuit configured to receive and/or transmit radio communication signals according to the first communication protocol and a second circuit configured to receive and/or transmit radio communication signals according to the second communication protocol. In example 31A, the subject matter of example 29A or example 30A, may further include: a measurement circuit to measure the received radio communication signals; can optionally include that the processor is configured to obtain the information indicating the proximity based on an output of the measurement circuit. In example 32A, the subject matter of example 31A, can optionally include that the information indicating the proximity includes at least one received signal strength indicator (RSSI). In example 33A, the subject matter of example 31A, can optionally include that the processor is configured to determine to hand over the established connection based on at least two RSSIs.

In example 34A, the subject matter of any one of examples 31A to 33A, can optionally include that the processor is configured to obtain the information indicating the proximity based on the measurement related to the received radio communication signals. In example 35A, the subject matter of any one of examples 27A to 34A, can optionally include that the first communication protocol includes a Bluetooth protocol; and can optionally include that the second communication protocol includes an IEEE 802. 11 protocol, or a cellular communication protocol. In example 36A, the subject matter of any one of examples 27A to 35A, can optionally include that the processor is further configured to establish the connection with the second communication device according to the first communication protocol based on the decoded message. In example 37A, the subject matter of any one of examples 27A to 36A, can optionally include that the processor is further configured to attempt to establish the connection with the second communication device in response to the decoded message. In example 38A, the subject matter of any one of examples 31A to 37A, can optionally include that the processor is further configured to obtain the information indicating the proximity between the communication device and the second communication device based on the decoded message.

In example 39A, the subject matter of any one of examples 31A to 38A, can optionally include that the processor is further configured to establish the connection with the second communication device according to the first communication protocol based on the information indicating the proximity between the communication device and the second communication device.

In example 40A, the subject matter of any one of examples 27A to 39A, can optionally include that the processor is further configured to encode a handover request message indicating the established connection with the second communication device for a transmission to the first communication device. In example 41A, the subject matter of example 40A, can optionally include that the handover request message includes proximity information indicating the proximity of the communication device to the second communication device. In example 42A, the subject matter of any one of examples 27A to 41A, may further include a memory configured to buffer the received data. In example 43A, the subject matter of any one of examples 27A to 42A, can optionally include that the processor is further configured to decode a handover response message in response to the transmission of the handover request message. In example 44A, the subject matter of any one of examples 27A to 43A, can optionally include that the processor is further configured to encode an acknowledgement message in response to receiving the received data.

In example 45A, the subject matter of any one of examples 27A to 44A, can optionally include that the processor is further configured to encode a handover termination message based on the information indicating the proximity of the communication device to the second communication device; can optionally include that the handover termination message indicates a request to hand over the connection between the communication device and the second communication device. In example 46A, the subject matter of any one of examples 27A to 45A, can optionally include that the processor is further configured to encode the data according to the first communication protocol. In example 47A, the subject matter of any one of examples 27A to 46A, can optionally include that the encoded data includes at least one of audio data, video data, user data. In example 48A, the subject matter of any one of examples 27A to 37A, may further include a memory configured to store an identifier for the second communication device; can optionally include that the decoded message includes the identifier for the second communication device. In example 49A, the subject matter of any one of examples 27A to 36A, can optionally include that the decoded message includes an identifier for the first communication device. In example 50A, the subject matter of any one of examples 27A to 49A, can optionally include that the encoded message includes an identifier for the first communication device.

In example 51A, a non-transitory computer-readable medium may include one or more instructions which, if executed by a processor, causes the processor to: determine to hand over an established connection with a first communication device based on information indicating a proximity of the first communication device to the communication device, can optionally include that the established connection is configured to exchange data between the communication device and the first communication device according to a first communication protocol; encode a message indicating the handover of the established connection for a transmission to a second communication device; encode data to be transmitted to the first communication device for a transmission to the second communication device according to a second communication protocol.

In example 52A, a non-transitory computer-readable medium may include one or more instructions which, if executed by a processor, causes the processor to: decode a received message indicating a handover of an established connection to exchange data between the first communication device and a second communication device according to a first communication protocol; establish a connection with the second communication device according to the first communication protocol based on the decoded message; encode data for a transmission to the second communication device using the first communication protocol based on received data received from the first communication device using a second communication protocol.

In example 53A, a communication device may include: a means for determining to hand over an established connection with a first communication device based on information indicating a proximity of the first communication device to the communication device, can optionally include that the established connection is configured to exchange data between the communication device and the first communication device according to a first communication protocol; a means for encoding a message indicating the handover of the established connection for a transmission to a second communication device; a means for encoding data to be transmitted to the first communication device for a transmission to the second communication device according to a second communication protocol.

In example 54A, a communication device may include: a means for decoding a received message indicating a handover of an established connection to exchange data between the first communication device and a second communication device according to a first communication protocol; a means for establishing a connection with the second communication device according to the first communication protocol based on the decoded message; a means for encoding data for a transmission to the second communication device using the first communication protocol based on received data received from the first communication device using a second communication protocol.

In example 55A, the subject matter includes a method that may include: determining to hand over an established connection with a first communication device based on information indicating a proximity of the first communication device to the communication device, can optionally include that the established connection is configured to exchange data between the communication device and the first communication device according to a first communication protocol; encoding a message indicating the handover of the established connection for a transmission to a second communication device; encoding data to be transmitted to the first communication device for a transmission to the second communication device according to a second communication protocol.

In example 56A, the subject matter of example 55A, may further include: transmitting and/or receiving radio communication signals according to the first communication protocol and transmitting and/or receiving radio communication signals according to the second communication protocol. In example 57A, the subject matter of example 56A, may further include measuring the received radio communication signals; obtaining the information indicating the proximity based on an output of a measurement circuit. In example 58A, the subject matter of example 57A, can optionally include that the information indicating the proximity includes at least one received signal strength indicator (RSSI). In example 59A, the subject matter of example 57A or example 58A, may further include: determining to hand over the established connection based on at least two RSSIs. In example 60A, the subject matter of any one of examples 55A to 59A, can optionally include that the first communication protocol includes a Bluetooth protocol; can optionally include that the second communication protocol includes an IEEE 802.11 protocol or a cellular communication protocol.

In example 61A, the subject matter of any one of examples 55A to 60A, may further include: ceasing the established connection with the first communication device after encoding the message. In example 62A, the subject matter of any one of examples 55A to 61A, may further include: decoding a received message in response to the message indicating a response of the second communication device to take over the established connection; ceasing the established connection with the first communication device based on the received message. In example 63A, the subject matter of any one of examples 55A to 62A, may further include: encoding the message indicating the handover for transmissions to a plurality of second communication devices; decoding received messages from the plurality of second communication devices received in response to the message; handing over the established connection to one of the plurality of second communication devices based on the decoded received messages. In example 64A, the subject matter of example 63A, can optionally include that each received message includes proximity information indicating a proximity of the first communication device to a respective second communication device of the plurality of second communication devices.

In example 65A, the subject matter of any one of examples 63A or 64A, may further include decoding a handover termination message received from the one of the plurality of second communication devices; can optionally include that the handover termination message indicates a request from the second communication device to hand over a connection between the first communication device and the second communication device according to the first communication protocol. In example 66A, the subject matter of example 65A, may further include: handing over the connection to another one of the plurality of second communication devices in response to the handover termination message. In example 67A, the subject matter of example 66A, may further include: encoding a second message indicating the determined handover for transmission to the plurality of second communication devices; decoding second received messages from the plurality of second communication devices in response to the second message; determining the another one of the plurality of second communication devices based on the second received messages.

In example 68A, the subject matter of any one of examples 63A to 67A, may further include: decoding a selection message received from the first communication device; can optionally include that the processor is further configured to hand over the established connection to one of the plurality of second communication devices based on the decoded selection message. In example 69A, the subject matter of any one of examples 63A to 68A, may further include: encoding the message indicating the handover for a transmission to a remote server coupled to the plurality of second communication devices. In example 70A, the subject matter of any one of examples 55A to 69A, may further include: decoding a handover request message may include a request to take over the established connection from the second communication device; encoding a handover response message for the second communication device in response to the handover request message, can optionally include that the handover response message includes an indication of an established connection between the first communication device and the second communication device.

In example 71A, the subject matter of example 70A, may further include: encoding the data for the transmission to the second communication device according to the second communication protocol in response to the handover response message. In example 72A, the subject matter of any one of examples 55A to 71A, may further include: decoding an acknowledgement message indicating a reception of the encoded data from the second communication device; ceasing the established connection with the first communication device based on the acknowledgement message. In example 73A, the subject matter of any one of examples 55A to 72A, may further include: decoding a handover termination message received from the second communication device; can optionally include that the handover termination message indicates a request from the second communication device to hand over a connection between the first communication device and the second communication device; establishing a second connection with the first communication device in response to the handover termination message. In example 74A, the subject matter of any one of examples 55A to 73A, can optionally include that the encoded data includes information that is encoded according to the first communication protocol.

In example 75A, the subject matter of any one of examples 55A to 74A, can optionally include that the encoded data includes at least one of audio data, video data, user data. In example 76A, the subject matter of any one of examples 55A to 75A, may further include: storing an identifier for the first communication device; can optionally include that the message includes the identifier for the first communication device. In example 77A, the subject matter of any one of examples 55A to 76A, can optionally include that the encoded data includes the identifier for the first communication device. In example 78A, the subject matter of any one of examples 55A to 77A, may further include: storing an identifier for the second communication device; encoding a message to the first communication device, can optionally include that the message includes the identifier for the second communication device. In example 79A, the subject matter of any one of examples 55A to 78A, may further include: establishing a session to exchange the data with the first communication device according to the first communication protocol; transmitting data to be exchanged with respect to the established session with the first communication device to the second communication device. In example 80A, the subject matter of any one of examples 55A to 79A, may further include: receiving data transmitted by the first communication device over the second communication device.

In example 81A, the subject matter includes a method that may include: decoding a received message indicating a handover of an established connection to exchange data between a first communication device and a second communication device according to a first communication protocol; establishing a connection with the second communication device according to the first communication protocol based on the decoded message; encoding data for a transmission to the second communication device using the first communication protocol based on received data received from the first communication device using a second communication protocol.

In example 82A, the subject matter of example 81A, can optionally include that the encoded data includes the received data received from the first communication device. In example 83A, the subject matter of example 81A or example 82A, may further include: transmitting and/or receiving radio communication signals. In example 84A, the subject matter of example 83A, may further include: receiving and/or transmitting radio communication signals, by a first circuit, according to the first communication protocol and receiving and/or transmitting radio communication signals, by a second circuit, according to the second communication protocol. In example 85A, the subject matter of example 83A or example 84A, may further include: measuring the received radio communication signals; obtaining the information indicating the proximity based on an output of the measurement circuit. In example 86A, the subject matter of example 85A, can optionally include that the information indicating the proximity includes at least one received signal strength indicator (RSSI).

In example 87A, the subject matter of example 85A, may further include determining to hand over the established connection based on at least two RSSIs. In example 88A, the subject matter of any one of examples 85A to 87A, may further include: obtaining the information indicating the proximity based on the measurement related to the received radio communication signals. In example 89A, the subject matter of any one of examples 81A to 88A, can optionally include that the first communication protocol includes a Bluetooth protocol; and can optionally include that the second communication protocol includes an IEEE 802.11 protocol, or a cellular communication protocol. In example 90A, the subject matter of any one of examples 81A to 89A, may further include: establishing the connection with the second communication device according to the first communication protocol based on the decoded message. In example 91A, the subject matter of any one of examples 81A to 90A, may further include: attempting to establish the connection with the second communication device in response to the decoded message.

In example 92A, the subject matter of any one of examples 85A to 91A, may further include: obtaining the information indicating the proximity between the method and the second communication device based on the decoded message. In example 93A, the subject matter of any one of examples 85A to 92A, may further include: establishing the connection with the second communication device according to the first communication protocol based on the information indicating the proximity to the second communication device. In example 94A, the subject matter of any one of examples 81A to 93A, may further include: encoding a handover request message indicating the established connection with the second communication device for a transmission to the first communication device. In example 95A, the subject matter of example 94A, can optionally include that the handover request message includes proximity information indicating the proximity of the method to the second communication device. In example 96A, the subject matter of any one of examples 81A to 95A, may further include: buffering the received data in a memory. In example 97A, the subject matter of any one of examples 81A to 96A, may further include: decoding a handover response message in response to the transmission of the handover request message. In example 98A, the subject matter of any one of examples 81A to 97A, may further include: encoding an acknowledgement message in response to receiving the received data.

In example 99A, the subject matter of any one of examples 81A to 98A, may further include: encoding a handover termination message based on the information indicating the proximity of the method to the second communication device; can optionally include that the handover termination message indicates a request to hand over the connection between the method and the second communication device. In example 100A, the subject matter of any one of examples 81A to 99A, may further include: encoding the data according to the first communication protocol. In example 101A, the subject matter of any one of examples 81A to 100A, can optionally include that the encoded data includes at least one of audio data, video data, user data. In example 102A, the subject matter of any one of examples 81A to 101A, storing an identifier for the second communication device; can optionally include that the decoded message includes the identifier for the second communication device. In example 103A, the subject matter of any one of examples 81A to 102A, can optionally include that the decoded message includes an identifier for the first communication device. In example 104A, the subject matter of any one of examples 81A to 103A, can optionally include that the encoded message includes an identifier for the first communication device.

In example 1B, the subject matter includes a communication device that may include: a processor configured to: determine to hand over an established connection with a first communication device based on information indicating a proximity of the first communication device to the communication device, can optionally include that the established connection is configured to exchange data between the communication device and the first communication device according to a first communication protocol; encode a message indicating the handover of the established connection for a transmission to a second communication device; decode received data received from the second communication device according to a second communication protocol, can optionally include that the received data includes the data transmitted by the first communication device.

In example 2B, the subject matter of example 1B, may further include: a transceiver circuit configured to transmit and/or receive radio communication signals. In example 3B, the subject matter of example 2B, can optionally include that the transceiver circuit includes a first circuit configured to receive and/or transmit the radio communication signals according to the first communication protocol and a second circuit configured to receive and/or the transmit radio communication signals according to the second communication protocol. In example 4B, the subject matter of example 2B or example 3B, may further include a measurement circuit configured to measure the received radio communication signals; can optionally include that the processor is configured to obtain the information indicating the proximity based on an output of the measurement circuit. In example 5B, the subject matter of example 4B, can optionally include that the information indicating the proximity includes at least one received signal strength indicator (RSSI). In example 6B, the subject matter of example 4B or example 5B, can optionally include that the processor is configured to determine to hand over the established connection based on at least two RSSIs.

In example 7B, the subject matter of any one of examples 1B to 6B, can optionally include that the first communication protocol includes a Bluetooth protocol; can optionally include that the second communication protocol includes an IEEE 802.11 protocol or a cellular communication protocol. In example 8B, the subject matter of any one of examples 1B to 7B, can optionally include that the processor is further configured to cease the established connection with the first communication device after encoding the message. In example 9B, the subject matter of any one of examples 1B to 8B, can optionally include that the processor is further configured to decode a received message in response to the message indicating a response of the second communication device to take over the established connection; can optionally include that the processor is further configured to cease the established connection with the first communication device based on the received message. In example 10B, the subject matter of any one of examples 1B to 9B, can optionally include that the processor is further configured to encode the message indicating the handover for transmissions to a plurality of second communication devices; can optionally include that the processor is further configured to decode received messages from the plurality of second communication devices received in response to the message; can optionally include that the processor is further configured to hand over the established connection to one of the plurality of second communication devices based on the decoded received messages.

In example 11B, the subject matter of example 10B, can optionally include that each received message includes proximity information indicating a proximity of the first communication device to a respective second communication device of the plurality of second communication devices. In example 12B, the subject matter of any one of examples 10B or 11B, can optionally include that the processor is further configured to decode a handover termination message received from the one of the plurality of second communication devices; can optionally include that the handover termination message indicates a request from the second communication device to hand over a connection between the first communication device and the second communication device according to the first communication protocol. In example 13B, the subject matter of example 12B, can optionally include that the processor is further configured to hand over the connection to another one of the plurality of second communication devices in response to the handover termination message. In example 14B, the subject matter of example 13B, can optionally include that the processor is further configured to encode a second message indicating the determined handover for transmission to the plurality of second communication devices; can optionally include that the processor is further configured to decode second received messages from the plurality of second communication devices in response to the second message; can optionally include that the processor is further configured to determine the another one of the plurality of second communication devices based on the second received messages.

In example 15B, the subject matter of any one of examples 10B to 14B, can optionally include that the processor is further configured to decode a selection message received from the first communication device; can optionally include that the processor is further configured to hand over the established connection to one of the plurality of second communication devices based on the decoded selection message. In example 16B, the subject matter of any one of examples 10B to 15B, can optionally include that the processor is further configured to encode the message indicating the handover for a transmission to a remote server coupled to the plurality of second communication devices. In example 17B, the subject matter of any one of examples 1B to 16B, can optionally include that the processor is configured to decode a handover request message may include a request to take over the established connection from the second communication device; can optionally include that the processor is further configured to encode a handover response message for the second communication device in response to the handover request message, can optionally include that the handover response message includes an indication of an established connection between the first communication device and the second communication device.

In example 18B, the subject matter of example 17B, can optionally include that the processor is further configured to decode the received data according to the second communication protocol in response to the handover response message. In example 19B, the subject matter of any one of examples 1B to 18B, can optionally include that the processor is further configured to decode an acknowledgement message received from the first communication device indicating a reception of decoded data from the second communication device; can optionally include that the processor is further configured to cease the established connection with the first communication device based on the acknowledgement message. In example 20B, the subject matter of any one of examples 1B to 19B, can optionally include that the processor is further configured to decode a handover termination message received from the second communication device; can optionally include that the handover termination message indicates a request from the second communication device to hand over a connection between the first communication device and the second communication device; can optionally include that the processor is further configured to establish a second connection with the first communication device in response to the handover termination message. In example 21B, the subject matter of any one of examples 1B to 20B, can optionally include that the decoded received data includes information that is encoded according to the first communication protocol. In example 22B, the subject matter of any one of examples 1B to 21B, can optionally include that the decoded data includes at least one of audio data, video data, user data.

In example 23B, the subject matter of any one of examples 1B to 22B, may further include a memory configured to store an identifier for the first communication device; can optionally include that the message includes the identifier for the first communication device. In example 24B, the subject matter of any one of examples 1B to 23B, can optionally include that the decoded received data includes the identifier for the first communication device. In example 25B, the subject matter of any one of examples 1B to 24B, can optionally include that the memory is further configured to store an identifier for the second communication device; can optionally include that the processor is further configured to encode a message to the first communication device, can optionally include that the message includes the identifier for the second communication device. In example 26B, the subject matter of any one of examples 1B to 25B, can optionally include that the processor is configured to establish a session to exchange the data with the first communication device according to the first communication protocol; can optionally include that the processor is configured to receive data that is exchanged with respect to the established session with the first communication device from the second communication device.

In example 27B, the subject matter includes a communication device that may include: a processor configured to: decode a received message indicating a handover of an established connection to exchange data between the first communication device and a second communication device according to a first communication protocol; establish a connection with the second communication device according to the first communication protocol based on the decoded message; encode data for a transmission to the first communication device using the second communication protocol based on received data received from the second communication device using a first communication protocol.

In example 28B, the subject matter of example 27B, can optionally include that the encoded data includes the received data received from the second communication device. In example 29B, the subject matter of example 27B or example 28B, may further include: a transceiver circuit configured to transmit and/or receive radio communication signals. In example 30B, the subject matter of example 29B, can optionally include that the transceiver circuit includes a first circuit configured to receive and/or transmit radio communication signals according to the first communication protocol and a second circuit configured to receive and/or transmit radio communication signals according to the second communication protocol. In example 31B, the subject matter of example 29B or example 30B, may further include: a measurement circuit to measure the received radio communication signals; can optionally include that the processor is configured to obtain the information indicating the proximity based on an output of the measurement circuit. In example 32B, the subject matter of example 31B, can optionally include that the information indicating the proximity includes at least one received signal strength indicator (RSSI).

In example 33B, the subject matter of example 31B, can optionally include that the processor is configured to determine to hand over the established connection based on at least two RSSIs. In example 34B, the subject matter of any one of examples 31B to 33B, can optionally include that the processor is configured to obtain the information indicating the proximity based on the measurement related to the received radio communication signals. In example 35B, the subject matter of any one of examples 27B to 34B, can optionally include that the first communication protocol includes a Bluetooth protocol; and can optionally include that the second communication protocol includes an IEEE 802.11 protocol or a cellular communication protocol. In example 36B, the subject matter of any one of examples 27B to 35B, can optionally include that the processor is further configured to establish the connection with the second communication device according to the first communication protocol based on the decoded message. In example 37B, the subject matter of any one of examples 27B to 36B, can optionally include that the processor is further configured to attempt to establish the connection with the second communication device in response to the decoded message.

In example 38B, the subject matter of any one of examples 31B to 37B, can optionally include that the processor is further configured to obtain the information indicating the proximity between the communication device and the second communication device based on the decoded message. In example 39B, the subject matter of any one of examples 31B to 38B, can optionally include that the processor is further configured to establish the connection with the second communication device according to the first communication protocol based on the information indicating the proximity between the communication device and the second communication device. In example 40B, the subject matter of any one of examples 27B to 39B, can optionally include that the processor is further configured to encode a handover request message indicating the established connection with the second communication device for a transmission to the first communication device.

In example 41B, the subject matter of example 40B, can optionally include that the handover request message includes proximity information indicating the proximity of the communication device to the second communication device. In example 42B, the subject matter of any one of examples 27B to 41B, may further include a memory configured to buffer the received data. In example 43B, the subject matter of any one of examples 27B to 42B, can optionally include that the processor is further configured to decode a handover response message in response to the transmission of the handover request message. In example 44B, the subject matter of any one of examples 27B to 43B, can optionally include that the processor is further configured to encode an acknowledgement message for a transmission to the first communication device in response to receiving the received data. In example 45B, the subject matter of any one of examples 27B to 44B, can optionally include that the processor is further configured to encode a handover termination message based on the information indicating the proximity of the communication device to the second communication device; can optionally include that the handover termination message indicates a request to hand over the connection between the communication device and the second communication device.

In example 46B, the subject matter of any one of examples 27B to 45B, can optionally include that the processor is further configured to encode the data according to the second communication protocol based on the received data according to the first communication protocol. In example 47B, the subject matter of any one of examples 27B to 46B, can optionally include that the encoded data includes at least one of audio data, video data, user data. In example 48B, the subject matter of any one of examples 27B to 47B, may further include a memory configured to store an identifier for the second communication device; can optionally include that the decoded message includes the identifier for the second communication device. In example 49B, the subject matter of any one of examples 27B to 48B, can optionally include that the encoded data includes the identifier for the second communication device. In example 50B, the subject matter of any one of examples 27B to 49B, can optionally include that the decoded message includes the identifier for the first communication device.

In example 51B, the subject matter includes a non-transitory computer-readable medium that may include one or more instructions which, if executed by a processor, causes the processor to: determine to hand over an established connection with a first communication device based on information indicating a proximity of the first communication device to the communication device, can optionally include that the established connection is configured to exchange data between the communication device and the first communication device according to a first communication protocol; encode a message indicating the handover of the established connection for a transmission to a second communication device; decode received data received from the second communication device according to a second communication protocol, can optionally include that the received data includes the data transmitted by the first communication device.

In example 52B, the subject matter includes a non-transitory computer-readable medium that may include one or more instructions which, if executed by a processor, causes the processor to: decode a received message indicating a handover of an established connection to exchange data between the first communication device and a second communication device according to a first communication protocol; establish a connection with the second communication device according to the first communication protocol based on the decoded message; encode data for a transmission to the first communication device using the second communication protocol based on received data received from the second communication device using a first communication protocol.

In example 53B, the subject matter includes a communication device that may include: a means for determining to hand over an established connection with a first communication device based on information indicating a proximity of the first communication device to the communication device, can optionally include that the established connection is configured to exchange data between the communication device and the first communication device according to a first communication protocol; a means for encoding a message indicating the handover of the established connection for a transmission to a second communication device; a means for decoding received data received from the second communication device according to a second communication protocol, can optionally include that the received data includes the data transmitted by the first communication device.

In example 54B, the subject matter includes a communication device that may include: a means for decoding a received message indicating a handover of an established connection to exchange data between the first communication device and a second communication device according to a first communication protocol; a means for establishing a connection with the second communication device according to the first communication protocol based on the decoded message; a means for encoding data for a transmission to the first communication device using the second communication protocol based on received data received from the second communication device using a first communication protocol.

In example 55B, the subject matter includes a method that may include: determining to hand over an established connection with a first communication device based on information indicating a proximity of the first communication device to the communication device, can optionally include that the established connection is configured to exchange data between the communication device and the first communication device according to a first communication protocol; encoding a message indicating the handover of the established connection for a transmission to a second communication device; decoding received data received from the second communication device according to a second communication protocol, can optionally include that the received data includes the data transmitted by the first communication device.

In example 56B, the subject matter of example 55B, may further include: receiving radio communication signals may include the received data. In example 57B, the subject matter of example 56B, may further include: receiving and/or transmitting the radio communication signals, by a first circuit, according to the first communication protocol and receiving and/or the transmitting radio communication signals, by a second circuit, according to the second communication protocol. In example 58B, the subject matter of example 55B or example 56B, may further include: measuring the received radio communication signals; obtaining the information indicating the proximity based on an output of a measurement circuit. In example 59B, the subject matter of example 58B, can optionally include that the information indicating the proximity includes at least one received signal strength indicator (RSSI). In example 60B, the subject matter of example 58B or example 59B, may further include: determining to hand over the established connection based on at least two RSSIs. In example 61B, the subject matter of any one of examples 55B to 60B, can optionally include that the first communication protocol includes a Bluetooth protocol; can optionally include that the second communication protocol includes an IEEE 802.11 protocol or a cellular communication protocol.

In example 62B, the subject matter of any one of examples 55B to 61B, may further include: ceasing the established connection with the first communication device after encoding the message. In example 63B, the subject matter of any one of examples 55B to 62B, may further include: decoding a received message in response to the message indicating a response of the second communication device to take over the established connection; ceasing the established connection with the first communication device based on the received message. In example 64B, the subject matter of any one of examples 55B to 63B, may further include: encoding the message indicating the handover for transmissions to a plurality of second communication devices; decoding received messages from the plurality of second communication devices received in response to the message; handing over the established connection to one of the plurality of second communication devices based on the decoded received messages.

In example 65B, the subject matter of example 64B, can optionally include that each received message includes proximity information indicating a proximity of the first communication device to a respective second communication device of the plurality of second communication devices. In example 66B, the subject matter of any one of examples 64B or 65B, may further include: decoding a handover termination message received from the one of the plurality of second communication devices; can optionally include that the handover termination message indicates a request from the second communication device to hand over a connection between the first communication device and the second communication device according to the first communication protocol. In example 67B, the subject matter of example 66B, may further include: handing over the connection to another one of the plurality of second communication devices in response to the handover termination message. In example 68B, the subject matter of example 67B, may further include: encoding a second message indicating the determined handover for transmission to the plurality of second communication devices; decoding second received messages from the plurality of second communication devices in response to the second message; determining the another one of the plurality of second communication devices based on the second received messages.

In example 69B, the subject matter of any one of examples 64B to 68B, may further include: decoding a selection message received from the first communication device; handing over the established connection to one of the plurality of second communication devices based on the decoded selection message. In example 70B, the subject matter of any one of examples 64B to 69B, may further include: encoding the message indicating the handover for a transmission to a remote server coupled to the plurality of second communication devices. In example 71B, the subject matter of any one of examples 55B to 70B, may further include: decoding a handover request message may include a request to take over the established connection from the second communication device; encoding a handover response message for the second communication device in response to the handover request message, can optionally include that the handover response message includes an indication of an established connection between the first communication device and the second communication device. In example 72B, the subject matter of example 71B, may further include: decoding the received data according to the second communication protocol in response to the handover response message. In example 73B, the subject matter of any one of examples 55B to 72B, may further include: decoding an acknowledgement message received from the first communication device indicating a reception of decoded data from the second communication device; ceasing the established connection with the first communication device based on the acknowledgement message.

In example 74B, the subject matter of any one of examples 55B to 73B, may further include: decoding a handover termination message received from the second communication device; can optionally include that the handover termination message indicates a request from the second communication device to hand over a connection between the first communication device and the second communication device; establishing a second connection with the first communication device in response to the handover termination message. In example 75B, the subject matter of any one of examples 55B to 74B, can optionally include that the decoded received data includes information that is encoded according to the first communication protocol. In example 76B, the subject matter of any one of examples 55B to 75B, can optionally include that the decoded data includes at least one of audio data, video data, user data. In example 77B, the subject matter of any one of examples 55B to 76B, may further include: storing an identifier for the first communication device; can optionally include that the message includes the identifier for the first communication device. In example 78B, the subject matter of any one of examples 55B to 77B, can optionally include that the decoded received data includes the identifier for the first communication device. In example 79B, the subject matter of any one of examples 55B to 78B, may further include: storing an identifier for the second communication device; encoding a message to the first communication device, can optionally include that the message includes the identifier for the second communication device. In example 80B, the subject matter of any one of examples 55B to 79B, may further include: establishing a session to exchange the data with the first communication device according to the first communication protocol; receiving data that is exchanged with respect to the established session with the first communication device from the second communication device.

In example 81B, the subject matter includes a method that may include: decoding a received message indicating a handover of an established connection to exchange data between the first communication device and a second communication device according to a first communication protocol; establishing a connection with the second communication device according to the first communication protocol based on the decoded message; encoding data for a transmission to the first communication device using the second communication protocol based on received data received from the second communication device using a first communication protocol.

In example 82B, the subject matter of example 81B, can optionally include that the encoded data includes the received data received from the second communication device. In example 83B, the subject matter of example 81B or example 82B, may further include: transmitting radio communication signals may include the data. In example 84B, the subject matter of example 83B, may further include: receiving and/or transmitting radio communication signals, by a first circuit, according to the first communication protocol and receiving and/or transmitting radio communication signals, by a second circuit, according to the second communication protocol. In example 85B, the subject matter of example 83B or example 84B, may further include: measuring the received radio communication signals; obtaining the information indicating the proximity based on an output of the measurement circuit. In example 86B, the subject matter of example 85B, can optionally include that the information indicating the proximity includes at least one received signal strength indicator (RSSI).

In example 87B, the subject matter of example 85B, may further include: determining to hand over the established connection based on at least two RSSIs. In example 88B, the subject matter of any one of examples 85B to 87B, may further include: obtaining the information indicating the proximity based on the measurement related to the received radio communication signals. In example 89B, the subject matter of any one of examples 81B to 88B, can optionally include that the first communication protocol includes a Bluetooth protocol; and can optionally include that the second communication protocol includes an IEEE 802.11 protocol or a cellular communication protocol. In example 90B, the subject matter of any one of examples 81B to 89B, may further include: establishing the connection with the second communication device according to the first communication protocol based on the decoded message. In example 91B, the subject matter of any one of examples 81B to 90B, may further include: attempting to establish the connection with the second communication device in response to the decoded message.

In example 92B, the subject matter of any one of examples 85B to 91B, may further include: obtaining the information indicating the proximity between the communication device and the second communication device based on the decoded message. In example 93B, the subject matter of any one of examples 85B to 92B, may further include establishing the connection with the second communication device according to the first communication protocol based on the information indicating the proximity between the communication device and the second communication device. In example 94B, the subject matter of any one of examples 81B to 93B, may further include: encoding a handover request message indicating the established connection with the second communication device for a transmission to the first communication device. In example 95B, the subject matter of example 94B, can optionally include that the handover request message includes proximity information indicating the proximity of the communication device to the second communication device.

In example 96B, the subject matter of any one of examples 81B to 95B, may further include: buffering the received data in a memory. In example 97B, the subject matter of any one of examples 81B to 96B, may further include: decoding a handover response message in response to the transmission of the handover request message. In example 98B, the subject matter of any one of examples 81B to 97B, may further include: encoding an acknowledgement message for a transmission to the first communication device in response to receiving the received data. In example 99B, the subject matter of any one of examples 81B to 98B, may further include: encoding a handover termination message based on the information indicating the proximity of the communication device to the second communication device; can optionally include that the handover termination message indicates a request to hand over the connection between the communication device and the second communication device. In example 100B, the subject matter of any one of examples 81B to 99B, may further include: encoding the data according to the second communication protocol based on the received data according to the first communication protocol.

In example 101B, the subject matter of any one of examples 81B to 100B, can optionally include that the encoded data includes at least one of audio data, video data, user data. In example 102B, the subject matter of any one of examples 81B to 101B, may further include: storing an identifier for the second communication device in a memory; can optionally include that the decoded message includes the identifier for the second communication device. In example 103B, the subject matter of any one of examples 81B to 102B, can optionally include that the encoded data includes the identifier for the second communication device. In example 104B, the subject matter of any one of examples 81B to 103B, can optionally include that the decoded message includes the identifier for the first communication device.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or a controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements.

Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device comprising:
a processor configured to:
decode a received message indicating a handover of an established connection to exchange data between a first communication device and a second communication device according to a first communication protocol;
establish a connection with the second communication device according to the first communication protocol based on the decoded message;
encode data for a transmission to the second communication device using the first communication protocol based on received data received from the first communication device using a second communication protocol.

2. The communication device of claim 1, further comprising:
a transceiver circuit configured to transmit and/or receive radio communication signals;
wherein the transceiver circuit comprises a first circuit configured to receive and/or transmit the radio communication signals according to the first communication protocol and a second circuit configured to receive and/or transmit the radio communication signals according to the second communication protocol.

3. The communication device of claim 1, further comprising:
a measurement circuit to measure received radio communication signals;
wherein the processor is configured to obtain information indicating a proximity based on an output of the measurement circuit.

4. The communication device of claim 1,
wherein the processor is further configured to establish the connection with the second communication device according to the first communication protocol based on the decoded message.

5. The communication device of claim 1,
wherein the processor is further configured to establish the connection with the second communication device according to the first communication protocol based on information indicating a proximity between the communication device and the second communication device.

6. The communication device of claim 1,
wherein the processor is further configured to encode a handover request message indicating the established connection with the second communication device for a transmission to the first communication device;

wherein the handover request message comprises proximity information indicating a proximity of the communication device to the second communication device.

7. The communication device of claim 1, wherein the processor is further configured to decode the received data according to the second communication protocol and encode the decoded data according to the first communication protocol.

8. The communication device of claim 1, wherein the first communication protocol includes a Bluetooth protocol; and wherein the second communication protocol includes an IEEE 802.11 protocol, or a cellular communication protocol.

9. The communication device of claim 1, wherein the processor is further configured to attempt to establish the connection with the second communication device in response to the decoded message.

10. The communication device of claim 1, wherein the processor is further configured to encode an acknowledgment message in response to receiving the received data.

11. The communication device of claim 1, wherein the processor is further configured to encode a handover termination message based on information indicating a proximity of the communication device to the second communication device; wherein the handover termination message indicates a request to hand over the connection between the communication device and the second communication device.

12. The communication device of claim 1, wherein the encoded data comprises at least one of audio data, video data, or user data.

13. The communication device of claim 1, further comprising a memory configured to buffer the received data.

14. The communication device of claim 1, wherein the decoded message comprises an identifier for the second communication device, and wherein the communication device further comprises a memory configured to store the identifier for the second communication device.

15. A communication device comprising:

a processor configured to:

decode a received message indicating a handover of an established connection to exchange data between a first communication device and a second communication device according to a first communication protocol;

establish a connection with the second communication device according to the first communication protocol based on the decoded message;

encode data for a transmission to the first communication device using second communication protocol based on received data received from the second communication device using the first communication protocol.

16. The communication device of claim 15, wherein the encoded data comprises the received data received from the second communication device.

17. The communication device of claim 15, further comprising a memory configured to buffer the received data.

18. The communication device of claim 15, wherein the decoded message comprises an identifier for the second communication device, and wherein the communication device further comprises a memory configured to store the identifier for the second communication device.

19. The communication device of claim 15, wherein the processor is further configured to encode a handover termination message based on information indicating a proximity of the communication device to the second communication device; wherein the handover termination message indicates a request to hand over the connection between the communication device and the second communication device.

20. The communication device of claim 15, wherein the processor is further configured to encode an acknowledgment message in response to receiving the received data.

* * * * *